United States Patent
Roy et al.

(10) Patent No.: US 8,825,734 B2
(45) Date of Patent: Sep. 2, 2014

(54) PERSONAL WEB DISPLAY AND INTERACTION EXPERIENCE SYSTEM

(75) Inventors: Ashutosh Roy, Los Altos, CA (US); Promod Narang, Los Altos, CA (US)

(73) Assignee: Egain Corporation, Mountain View, CA (US)

( * ) Notice: Subject to any disclaimer, the term of this patent is extended or adjusted under 35 U.S.C. 154(b) by 6 days.

(21) Appl. No.: 13/360,578

(22) Filed: Jan. 27, 2012

(65) Prior Publication Data

US 2012/0198026 A1   Aug. 2, 2012

Related U.S. Application Data

(60) Provisional application No. 61/436,939, filed on Jan. 27, 2011.

(51) Int. Cl.
 *G06F 15/16*   (2006.01)

(52) U.S. Cl.
 USPC ........... 709/202; 709/217; 709/218; 709/219; 715/765; 715/811; 715/863; 715/866

(58) Field of Classification Search
 USPC .......... 709/202, 217, 218, 219; 715/744, 745, 715/746, 747, 749, 760, 765, 863, 811, 866
 See application file for complete search history.

(56) References Cited

U.S. PATENT DOCUMENTS

| | | | | |
|---|---|---|---|---|
| 7,263,663 | B2 * | 8/2007 | Ballard et al. | 715/762 |
| 7,412,655 | B2 * | 8/2008 | Wada et al. | 715/744 |
| 7,694,240 | B2 * | 4/2010 | Kariathungal et al. | 715/863 |
| 7,793,227 | B2 * | 9/2010 | Wada et al. | 715/779 |
| 8,504,985 | B2 * | 8/2013 | Kalaidjian | 717/113 |
| 2003/0083961 | A1 * | 5/2003 | Bezos et al. | 705/27 |
| 2005/0039144 | A1 * | 2/2005 | Wada et al. | 715/840 |
| 2006/0095860 | A1 * | 5/2006 | Wada et al. | 715/771 |
| 2007/0118400 | A1 * | 5/2007 | Morita et al. | 705/2 |
| 2007/0180386 | A1 * | 8/2007 | Ballard et al. | 715/744 |
| 2008/0104547 | A1 * | 5/2008 | Morita et al. | 715/863 |
| 2008/0114614 | A1 * | 5/2008 | Mahesh et al. | 705/2 |
| 2008/0114615 | A1 * | 5/2008 | Mahesh et al. | 705/2 |
| 2008/0120576 | A1 * | 5/2008 | Kariathungal et al. | 715/863 |
| 2008/0155425 | A1 * | 6/2008 | Murthy et al. | 715/738 |
| 2010/0235786 | A1 * | 9/2010 | Maizels et al. | 715/810 |
| 2010/0241507 | A1 * | 9/2010 | Quinn et al. | 705/14.42 |
| 2010/0250714 | A1 * | 9/2010 | Wehmann et al. | 709/220 |
| 2010/0306080 | A1 * | 12/2010 | Trandal et al. | 705/26.8 |
| 2010/0309147 | A1 * | 12/2010 | Fleizach et al. | 345/173 |
| 2010/0318938 | A1 * | 12/2010 | Kim et al. | 715/823 |
| 2011/0282927 | A1 * | 11/2011 | Arsenault | 709/201 |
| 2012/0047447 | A1 * | 2/2012 | Haq | 715/752 |
| 2012/0151375 | A1 * | 6/2012 | Lin et al. | 715/741 |
| 2012/0151420 | A1 * | 6/2012 | Amento et al. | 715/863 |
| 2012/0159401 | A1 * | 6/2012 | Pahud et al. | 715/863 |
| 2013/0174120 | A1 * | 7/2013 | Kalaidjian | 717/113 |
| 2014/0095480 | A1 * | 4/2014 | Marantz et al. | 707/722 |

* cited by examiner

*Primary Examiner* — Jimmy H Tran

(57) ABSTRACT

Embodiments of the present invention may be directed to an interactive system. The interactive system may include a browser application allowing a user to access a website using a communication pathway. The website provides website information in a standardized interchange protocol and also in webpages. The browser application is configured to allow user access to the webpages. The interactive system may also include a module of the browser application compatible with the standardized interchange protocol and configured to store and implement user personalized commands and to store recorded user history information. The module implements a graphical user interface with the website information that is personalized to the user. The graphical user interface includes a personalized display experience and a personalized interaction experience that are both custom designed for the user.

25 Claims, 16 Drawing Sheets

PERSONAL WEB DISPLAY AND INTERACTION EXPERIENCE SYSTEM

CROSS-REFERENCE TO RELATED APPLICATION

This application claims priority from U.S. Provisional Application No. 61/436,939, filed Jan. 27, 2011, entitled "Personal Interaction and Navigation Online System," by Roy, A., which is hereby incorporated by reference.

BACKGROUND OF THE INVENTION

Websites and web-based/mobile applications (hereinafter, websites) are heavily used for business, social, and government interactions. Users are required to learn how to best navigate each website because the information layout and information presentation, and navigation are unique to each specific website. While this uniqueness creates a unique user experience on each website, it also imposes a site-engagement burden on users as they struggle to learn each site's specific interaction models. This leads to poor user experience, visitor frustration, and high visitor bounce rates.

Some standardization has recently emerged in the form of best practice interfaces that websites can use to minimize user engagement burden. For example, top navigation bars and site-specific menu columns and blocks help create a somewhat standardized user experience in part. Similarly, search boxes have become a familiar way for a user to navigate and engage a website, even when they are not appropriate for many situations. However, website standardization is rarely explicit or architectural, rather it remains implicit, informal, and faddish.

One way to bridge the gap between the need for user familiarity and the need for differentiation is to offer personalized interaction options that can be consistently made available at any point of the website visit to improve user experience. However, today such interactive assistance is offered on an ad hoc basis and is inconsistent. When a visitor is stuck or confused on a website, the user does not have a universal "help" button to quickly obtain assistance. Most assistance available today is impersonal, pre-scripted, and requires extensive (and repetitive) information sharing prior to obtaining help.

Another significant gap in website interaction models is a lack of user personalization. Some sites offer a "My Website" type of personalization, but it is mostly limited to information pane layout and does not extend to interaction models. Further, the personalization is not context aware, e.g., it does not have knowledge of the user's identity, preferences, or real-time interaction history.

As a result, website visitors have to engage with each website differently in order to obtain the information they want. Website providers keep trying to guess the unique needs of the user and invariably either under-estimate or over-estimate what the user needs.

BRIEF SUMMARY OF THE INVENTION

Accordingly, a need exists for a web browsing experience that offers personalized navigation and information presentation options based on the user's identity, preferences, and real-time interaction history with the website. What is needed is a personal website experience that is custom to the user, regardless of the website that is visited. What is needed is a personal website interface that is personal to the user and consistent across different websites.

Embodiments of the present invention are directed to an interactive system. More specifically, the interactive system may include a browser application allowing a user to access a website using a communication pathway that may include the Internet. The website provides website information in a standardized interchange protocol and also in webpages. The browser application is configured to allow user access to the webpages. The interactive system may also include a module of the browser application compatible with the standardized interchange protocol and configured to store and implement user personalized commands and to store recorded user history information. The module implements a graphical user interface with the website information that is personalized to the user. The graphical user interface includes a personalized display experience and a personalized interaction experience that are both custom designed for the user.

Another embodiment of the present invention may be directed to another interactive system. More specifically, the interactive system may include a browser application allowing a user to access a website using a communication pathway including the Internet. The website provides website information in a standardized interchange protocol and also in user navigable webpages. The browser application is configured to allow user access to the webpages. The interactive system may also include a module interactive with the browser application. The module is compatible with the standardized interchange protocol and configured to store and implement user personalized commands that are user programmable and to store recorded user history information. The module implements a graphical user interface with the website information that is personalized to the user. The graphical user interface comprises a personalized display experience and a personalized interaction experience which are both custom to the user. The user personalized commands define an on-screen tool including a number of defined graphical elements each, upon user interaction, access a respective predefined content of the website information and cause the respective predefined content to be rendered in a respective predefined display location of a display screen associated with the browser.

Other embodiments of the present invention may be directed to another interactive system. More specifically, the interactive system may include a browser application allowing a user to access a website using a communication pathway including the Internet. The website provides website information in a standardized interchange protocol and also in user navigable webpages. The browser application is configured to allow user access to the webpages. The interactive system may also include a module interactive with the browser application. The module is compatible with the standardized interchange protocol and configured to store and implement user personalized commands that are user programmable and to store recorded user history information. The module implements a graphical user interface with the website information that is personalized to the user. The graphical user interface comprises a personalized display experience and a personalized interaction experience which are both custom to the user. The user personalized commands define a number of events that occur based on predefined rules, content of the website information, and user behavior.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Figure 1:
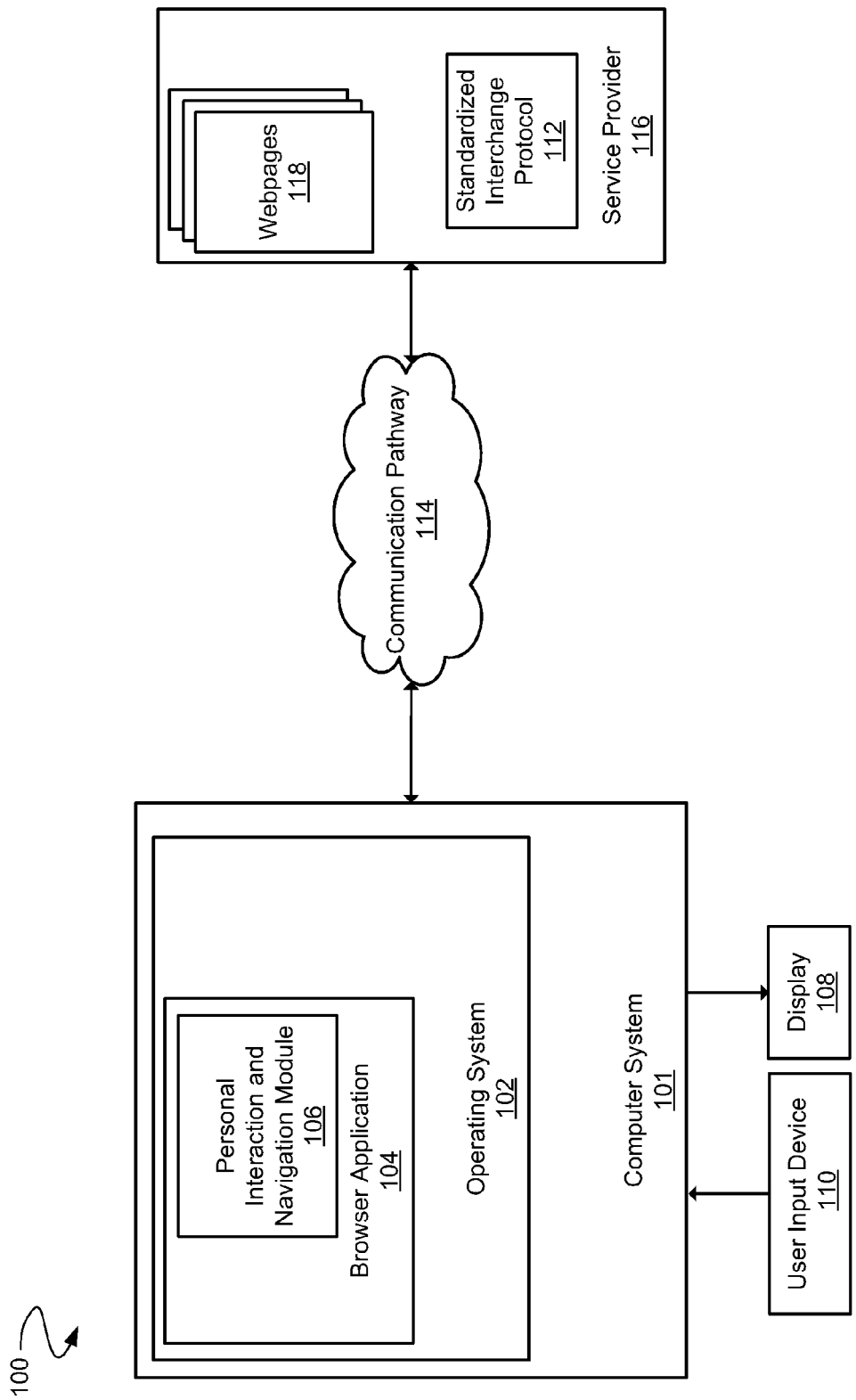
FIG. 1 shows an exemplary interactive system that is computer controlled and includes a personal interaction and navigation module on a user computer system, in accordance with one embodiment of the present invention.

FIG. 1 shows exemplary interactive computer system 100, in accordance with one embodiment of the present invention. Interactive system 100 depicts exemplary components in accordance with embodiments of the present invention providing the execution platform for certain hardware-based and software-based functionality. In general, interactive system 100 comprises a user computer system 101 including an operating system 102. The operating system 102 may include a browser application 104, among other applications typically used within an operating system. The browser application 104 may be of any well known web browser version, such as Microsoft Corporation's Internet Explorer, Apple Inc.'s Safari, Mozilla Corporation's Firefox, or Google Inc.'s Chrome. Browser application 104 may also be any browser application used on a mobile computer system, such as a mobile phone or tablet device. System 101 may be a mobile computer system.

A user may interact with the computer system 101 via a user input device 110 and display 108, for instance. The user input device 110 may be a keyboard, mouse, a user's finger, or any other user input device typically used to interact with a computer system. User input device 110 may be a touch panel or touch screen based interface.

Interactive system 100 also comprises a remote service provider 116. In an embodiment, service provider 116 provides user access to a plurality of webpages 118. A user may access the webpages 118 stored within the service provider 116 via a communication pathway 114. Webpages 118 present information to the user in ways prescribed by the service provider 116 which are not custom to the user and may be specific to the service provider 116. In an embodiment, communication pathway 114 may include components that include the Internet. Pathway 114 may include one or more wireless or and/or wired components. Advantageously communication via the computer system 101 to the service provider 116 over the communication pathway 114 is facilitated by use of a standardized protocol 112. In an embodiment, standardized protocol 112 may be a data interchange language similar to or compatible with the Extensible Markup Language (XML).

Protocol 112 allows information from the service provider 116 to be accessed by browser 104 and subsequently displayed to a user in a way that is personal or custom to the user and may be quite different than the way the information is presented in the website's webpages 118.

In embodiments of the present invention, browser application 104 includes personal interaction and navigation module (PINO) 106. PINO 106 is a layer, or a combination of multiple inter-operating layers, of configurable intelligence between a user and webpages 118. PINO 106 is compatible with reading data from the standardized protocol 112. Using PINO 106, a user can configure rules using input events (or non-events) or a combination of input event variables that will trigger specific actions or content display on a webpage 118. PINO 106 may track and store these input events, their associated actions, and the resulting interactions by the user with those proposed actions. Using the stored tracking data to train its response, PINO 106 may favor actions that result in favorable interactions by the user and suppress actions that tend to yield less favorable interactions by the user.

PINO 106 is responsible for presenting information obtained from the Service Provider 116, as expressed within the standardized protocol 112, to the user in accordance with a display format, or interface, that is personal to or custom for the user. In effect, PINO 106, once programmed, creates a graphical user interface for the user that is custom to the user. The GUI may also include events that occur based on rules and/or programs, within PINO 106, that again, are custom to the user. PINO 106 creates the GUI by interfacing with standardized protocol 112, e.g. XML, to obtain information pertinent to webpages 118. Because standardized protocol 112 stores webpage information in a standardized format, PINO 106 can create a custom GUI for the user without requiring knowledge of the unique layout of each webpage 118.

The possibilities of PINO 106 functionality can be illustrated by way of examples. A user can specify a PINO 106 rule that a certain user input within browser application 104, using user input device 110, results in an aggregated list of all relevant "help" options on a webpage 118. For example, the user input may be a "right-click" using a mouse. Alternatively, gestures like a circle or question mark, for example, drawn by moving the mouse or drawing on a touchscreen device may be interpreted as an instruction to show "help" options on a webpage 118.

In an embodiment, PINO 106 may be a plug-in to browser application 104. A user may download the PINO 106 plug-in to their browser application 104. The PINO 106 plug-in locally (within computer system 101) detects and traps user actions or gestures, accesses environmental variables using automated queries, and maps them using prescribed user-configured rules or actions for content display to the user during web browsing. In other words, a user may configure the PINO 106 plug-in to specify the user's context-sensitive commands using rules based on attributes such as, but not limited to, website type, page content, personal buying history, personal browsing history, preferences of friends (via social networks), and personal preferences.

Figure 2:
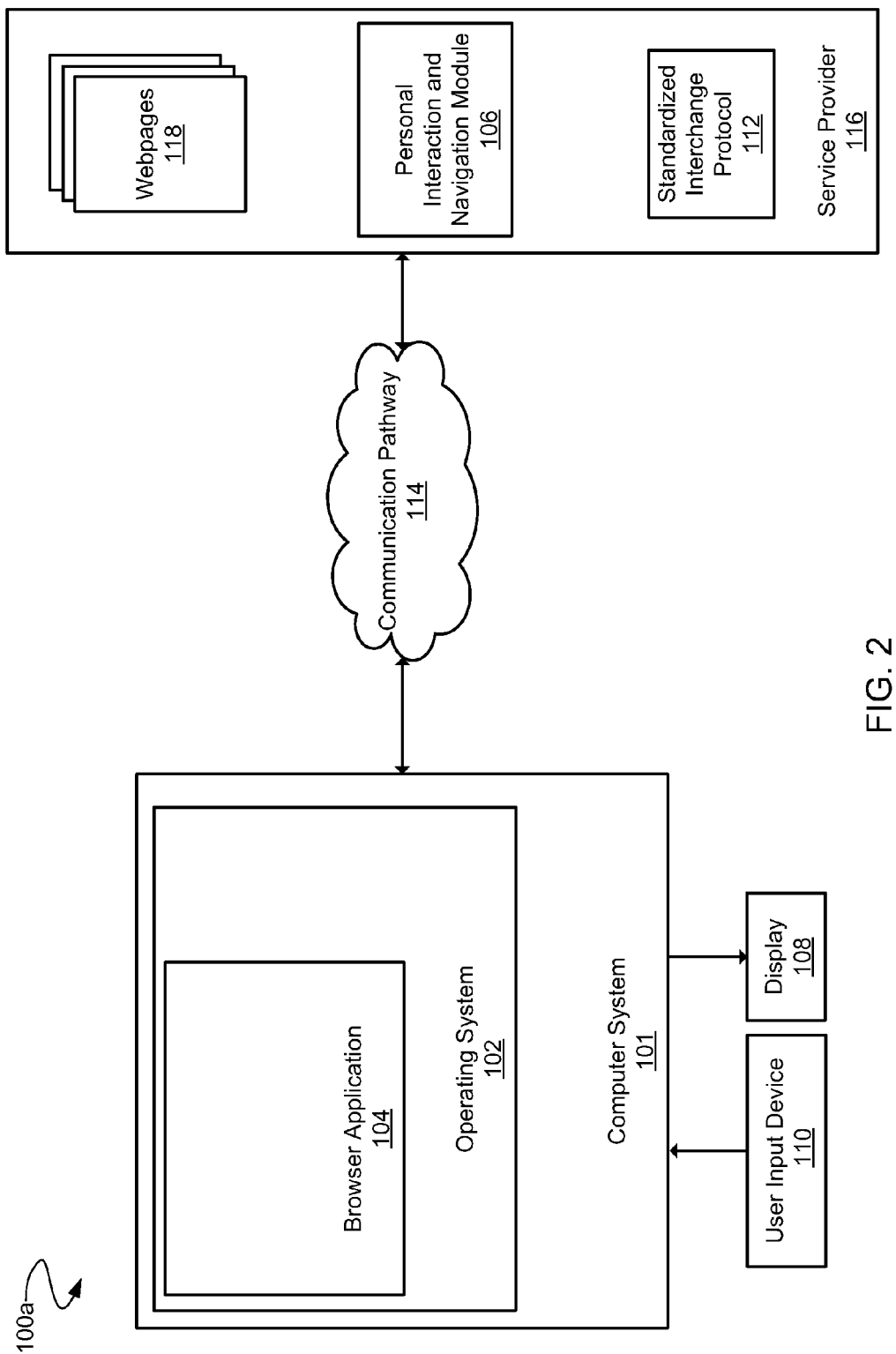
FIG. 2 shows an exemplary interactive computer system including a personal interaction and navigation module on a service provider, in accordance with one embodiment of the present invention.

FIG. 2 shows an exemplary interactive system comprising a personal interaction and navigation module on a service provider, in accordance with one embodiment of the present invention. FIG. 2 is analogous to FIG. 1 except that PINO 106 resides within the service provider 116, not on the client 101.

Interactive system 100a depicts the components in accordance with embodiments of the present invention providing the execution platform for certain hardware-based and software-based functionality. In general, interactive system 100a comprises a computer system 101 including an operating system 102. The operating system 102 may include a browser application 104, among other applications typically used within an operating system. The browser application 104 may be a web browser, such as Microsoft Corporation's Internet Explorer, Apple Inc.'s Safari, Mozilla Corporation's Firefox, or Google Inc.'s Chrome. Browser application 104 may also be any browser application used on a mobile computer system, such as mobile phone or tablet device.

A user may interact with the computer system 101 via a user input device 110 and display 108. The user input device 110 may be a keyboard, mouse, a user's finger, or any other user input device typically used to interact with a computer system.

Interactive system 100a also comprises a service provider 116. In an embodiment, service provider 116 provides user access to a plurality of webpages 118. A user may access the webpages 118 stored within the service provider 116 via a communication pathway 114. In an embodiment, communication pathway 114 may be the Internet. Communication via the computer system 101 to the service provider 116 over the communication pathway 114 is facilitated by use of a standardized protocol 112. In an embodiment, standardized protocol 112 may be Extensible Markup Language (XML).

In the present invention, PINO 106 may reside within the service provider 116. By residing within service provider 116, PINO 106 capability can be embedded into webpages 118 and configured by the service provider 116. Service provider 116 can specify which actions and displays will be offered for specific instructions that are typically not interpreted for use in webpage 118 navigation.

For example, service provider 116 can specify a right button click, selecting non-hyperlinked words, or other simple gestures or keystrokes as actions for specific instructions on a respective webpage 118. PINO 106 rules set by the service provider 116 can also be enriched by using browsed content, current or past visit history, and visitor context based on knowledge that the service provider 116 has collected about the user. The PINO 106 residing within the service provider 116 illustrates one extreme of PINO 106 functionality, while PINO 106 residing within the user's computer system 101 (as illustrated in FIG. 1), illustrates another extreme of PINO 106 functionality.

Figure 3:
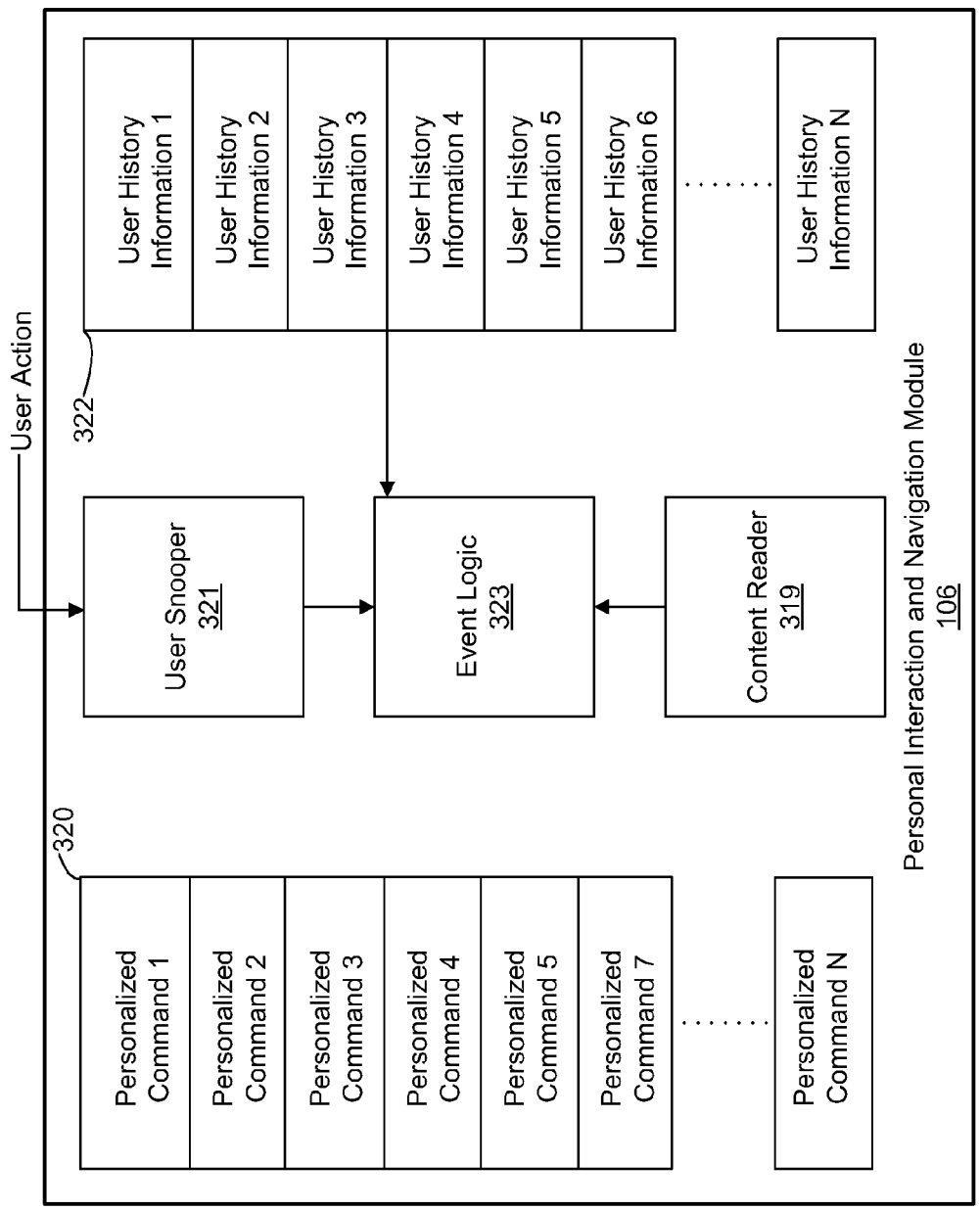
FIG. 3 shows a block diagram of exemplary components of a personal interaction and navigation module in accordance with one embodiment of the present invention.

FIG. 3 shows a block diagram of components of a personal interaction and navigation module 106 (PINO) in accordance with one embodiment of the present invention. The PINO 106 can store personalized command information 320 and user history information 322, among other elements and layers. Personalized commands 320 are user personalized commands or rules configured by the user using input events or a combination of input event variables that will trigger specific actions or content display within the webpage 118. These input events, their associated actions and display, and the resulting interactions by the user with those proposed actions and content display can be tracked and stored in the form of user history information 322.

User personalized commands may include a number of website content definitions pertaining to the website information and a predefined display position for each content definition for display. User personalized commands may also include a defined interactive event to occur based on the content of the website information in combination with the user history information 322. Further, user personalized commands may also include a defined interactive event to occur based on the content of the website information in combination with a real-time user interaction on the website.

User history information 322 may include information based on past user interactions pertinent to the website or a plurality of websites. User history information 322 can also include stored tracking data used to train webpage 118 response, favoring those actions that result in favorable interactions, as described above.

PINO 106 also includes an event logic module 323 for reading commands, and other information, and generating an event or sequence of actions. A user snooper module 321 monitors user input and actions and feeds recognized user actions to the event logic module 323. Additionally, a content reader 319 is included that can read and recognize website content. The content reader outputs to the event logic module 323.

Figure 4A:
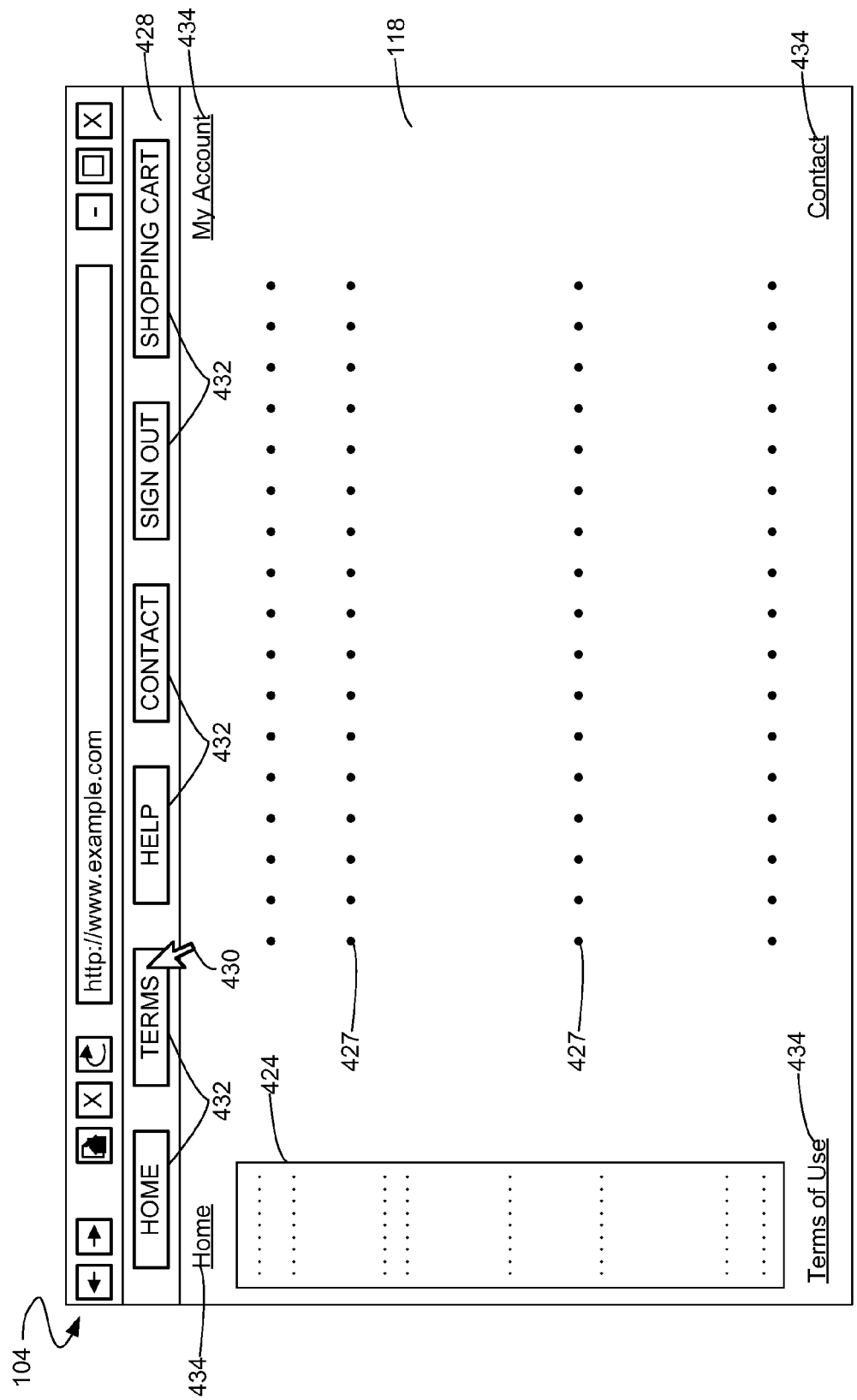
FIG. 4A shows an exemplary screenshot of a browser application comprising a personal interaction and navigation toolbar in accordance with one embodiment of the present invention.

FIG. 4A shows an exemplary screenshot of a GUI rendered by browser application 104 including a personal interaction and navigation toolbar 428 in accordance with one embodiment of the present invention. The browser application 104 is an application within an operating system 102 (FIG. 1) on a computer system 101 (FIG. 1). Browser application 104 is used to display web content of a webpage 118 on a display screen of the user computer.

Typical web content on a webpage 118 may include links 434 to other webpages 118 within a website or links 434 to other webpages 118 external to the website. Web content may also include text 427 displayed on the webpage 118 or sidebar information 424. Browser application 104 can be configured to install a PINO 106 (FIG. 1) plug-in employing a graphical user interface, as described above. A PINO 106 plug-in can be a toolbar 428 embedded into the browser application 104. The toolbar 428 can be configured to be displayed anywhere within the browser application 104 and can be hidden when not in use. Toolbar 428 can be configured to store and implement user personalized commands 320 (FIG. 3) for a personalized display and interaction experience custom designed by the user. User personalized commands 320 (FIG. 3) can be implemented using personalized buttons 432 within the toolbar 428. Each personalized button 432 can be associated with a respective website command and when triggered, can lead to the display of website information in a screen location and in a display format customized for the user, regardless of the website.

For example, personalized buttons 432 can be created for "HOME", "TERMS", "HELP", "CONTACT", "SIGN OUT", and "SHOPPING CART" on a particular website. Each personalized button 432 is associated with the respective webpage 118 within the website. A user may click 430 a personalized button 432 in order to access the respective webpage 118 associated with that personalized button 432. For example, a user click 430 on the personalized button 432 "TERMS" would take the user to the webpage 118 associated with the "Terms of Use" link 434 on the webpage 118. It can be appreciated that a user personalized button 432 can be associated with a link 434 to a webpage 118 that is buried within another link 434 on the website. For example, the user personalized button 432 "SIGN OUT" can be associated with a sign out link 434 that is buried within a "My Account" webpage 118 within a website. This allows the user to sign out of the website without first clicking the "My Account" link 434 in order to click a sign out link 434 found on a "My Account" webpage 118. This custom user configurability allows the user to navigate the website in the way that the user feels is best suited. By interfacing with the standardized interchange protocol 112 (FIG. 1), PINO 106 does not require knowledge of the unique location of the links 432 for the particular webpage 118. Information pertinent to the buttons 432 may be obtained by accessing the website data via the standardized protocol 112 (FIG. 1) which would have prescribed definitions for finding the data.

Figure 4B:
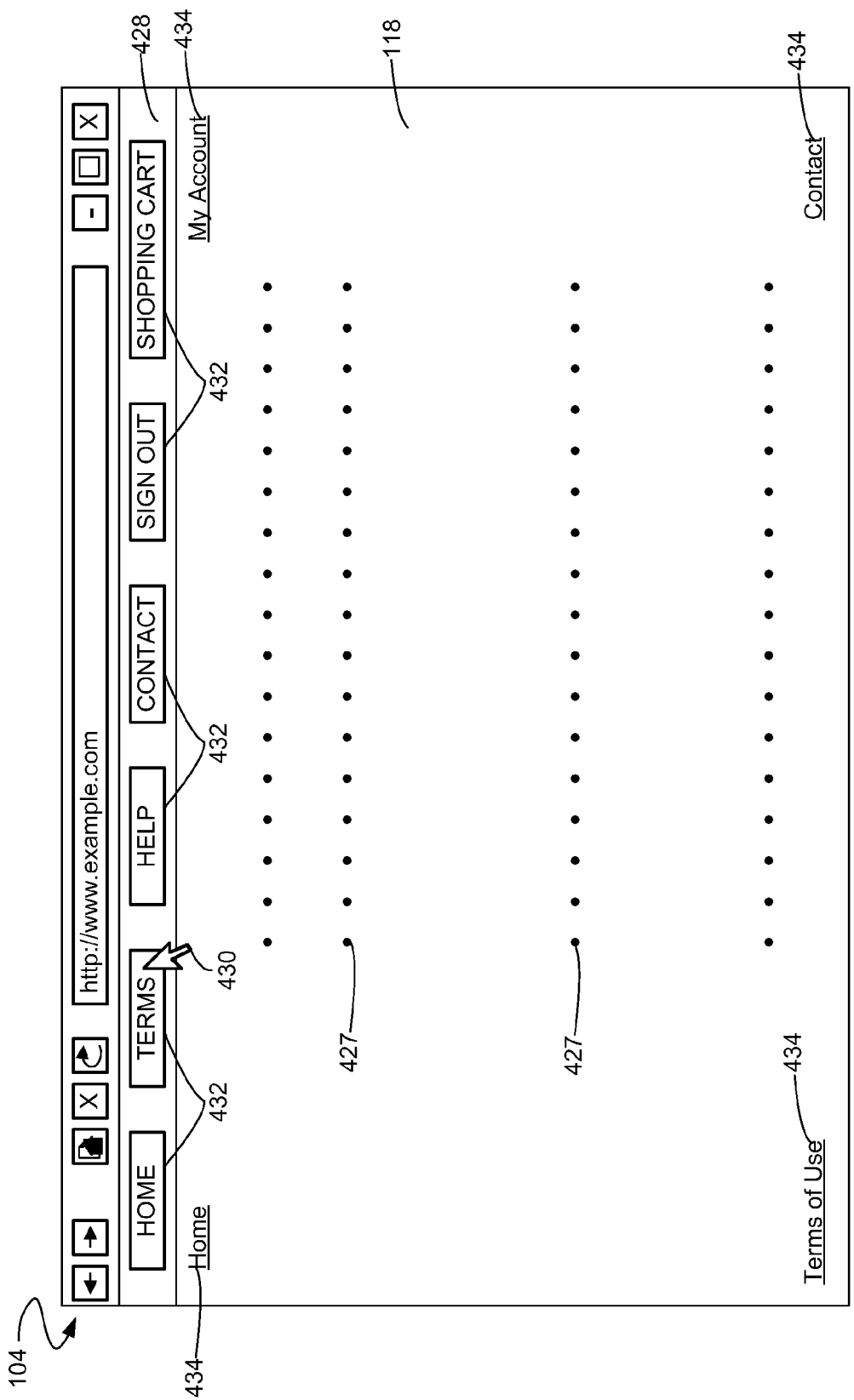
FIG. 4B shows an exemplary screenshot of a browser application displaying web content based on user history information in accordance with one embodiment of the present invention.

FIG. 4B shows an exemplary screenshot of a browser application 104 displaying web content based on user history information in accordance with one embodiment of the present invention. FIG. 4B is different FIG. 4A in that FIG. 4B does not include sidebar information 424 (FIG. 4A).

Typical web content on a webpage 118 may include links 434 to other webpages 118 within a website or links 434 to other webpages 118 external to the website. Web content may also include text 427 displayed on the webpage 118 or sidebar information 424 (FIG. 4A). Browser application 104 can be configured to install a PINO 106 (FIG. 1) plug-in employing a graphical user interface, as described above. The PINO 106 plug-in can be configured to execute a defined interactive event based on content of the webpage 118 in combination with user history information 322 (FIG. 3). User history information 322 can include tracked and stored data about the user's actions and preferences on a webpage 118 or plurality of webpages 118 during prior interactions with the website.

For example, if a user does not care to see sidebar information 424 (FIG. 4A) on a webpage 118, the user can configure PINO 106 (FIG. 1) to not display sidebar information 424 (FIG. 4A) upon the user's visit to the particular webpage 118. Alternatively, PINO 106 (FIG. 1) can also learn the user's preferences based and store the user history information 322 (FIG. 3) for future visits to the particular webpage 118. For example, if a user always elects to close sidebar information 424 (FIG. 4A) (assuming this is possible) on the webpage 118, PINO 106 (FIG. 1) will learn the user's preference of not wanting to see sidebar information 424 (FIG. 4A) on the webpage 118 and will not display sidebar information 424 (FIG. 4A) on the user's subsequent visits to the webpage 118. FIG. 4B depicts browser application 104 displaying web page 118 without sidebar information 424 (FIG. 4).

Figure 5A:
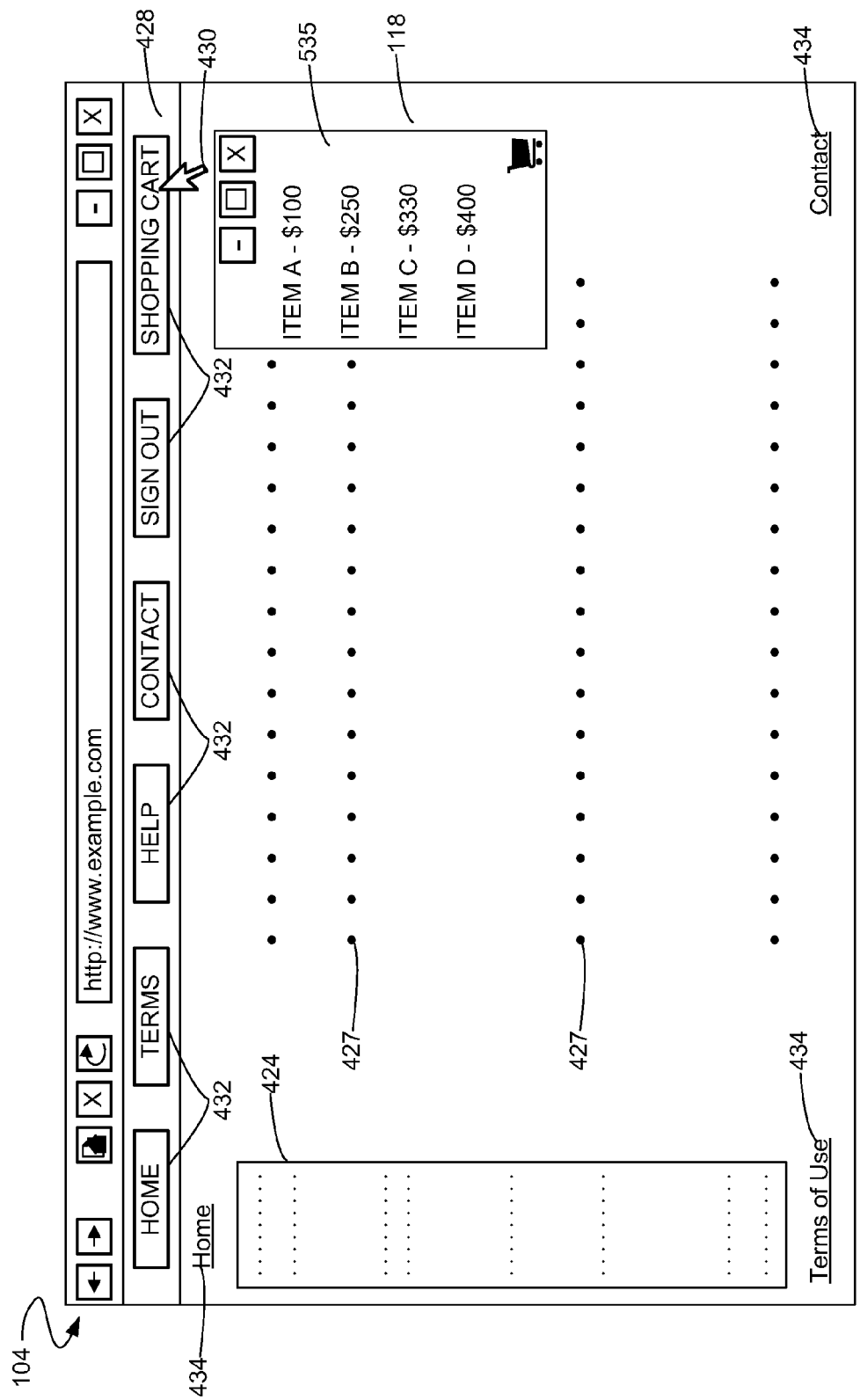
FIG. 5A shows an exemplary screenshot of a browser application comprising a personal interaction and pop-up window in accordance with one embodiment of the present invention.

FIG. 5A shows an exemplary screenshot of a browser application comprising a personal interaction and pop-up window 535 in accordance with one embodiment of the present invention.

Typical web content on a webpage 118 may include links 434 to other webpages 118 within a website or links 434 to other webpages 118 external to the website. Web content may also include text 427 displayed on the webpage 118 or sidebar information 424. Browser application 104 can be configured to install a PINO 106 (FIG. 1) plug-in employing a graphical user interface, as described above. A PINO 106 plug-in can be a toolbar 428 embedded into the browser application 104. The toolbar 428 can be configured to be displayed anywhere within the browser application 104 and can be hidden when not in use. Toolbar 428 can be configured to store and implement user personalized commands 320 (FIG. 3) for a personalized display and interaction experience custom designed by the user. User personalized commands 320 (FIG. 3) can be implemented using personalized buttons 432 within the toolbar 428. Each personalized button 432 can be associated with a respective website command and when triggered, can lead to the display of website information in a screen location and in a display format customized for the user, regardless of the website.

For example, personalized buttons 432 can be created for "HOME", "TERMS", "HELP", "CONTACT", "SIGN OUT", and "SHOPPING CART" on a particular website. Each personalized button 432 is associated with the respective webpage 118 within the website. A user may click 430 a personalized button 432 in order to access the respective webpage 118 associated with that personalized button 432. For example, a user click 430 on the personalized button 432 "SHOPPING CART" would launch a pop-up window 535 displaying the contents of the user's shopping cart. It can be appreciated that a user personalized button 432 can be associated with a link 434 to a webpage 118 that is buried within another link 434 on the website. By interfacing with the standardized interchange protocol 112 (FIG. 1), PINO 106 does not require knowledge of the unique location of the shopping cart contents for the particular webpage 118. This custom user configurability allows the user to navigate the website in the way that the user feels is best suited. Information pertinent to the buttons 432 may be obtained by accessing the website data via the standardized protocol 112 (FIG. 1) which would have prescribed definitions for finding the data.

Figure 5B:
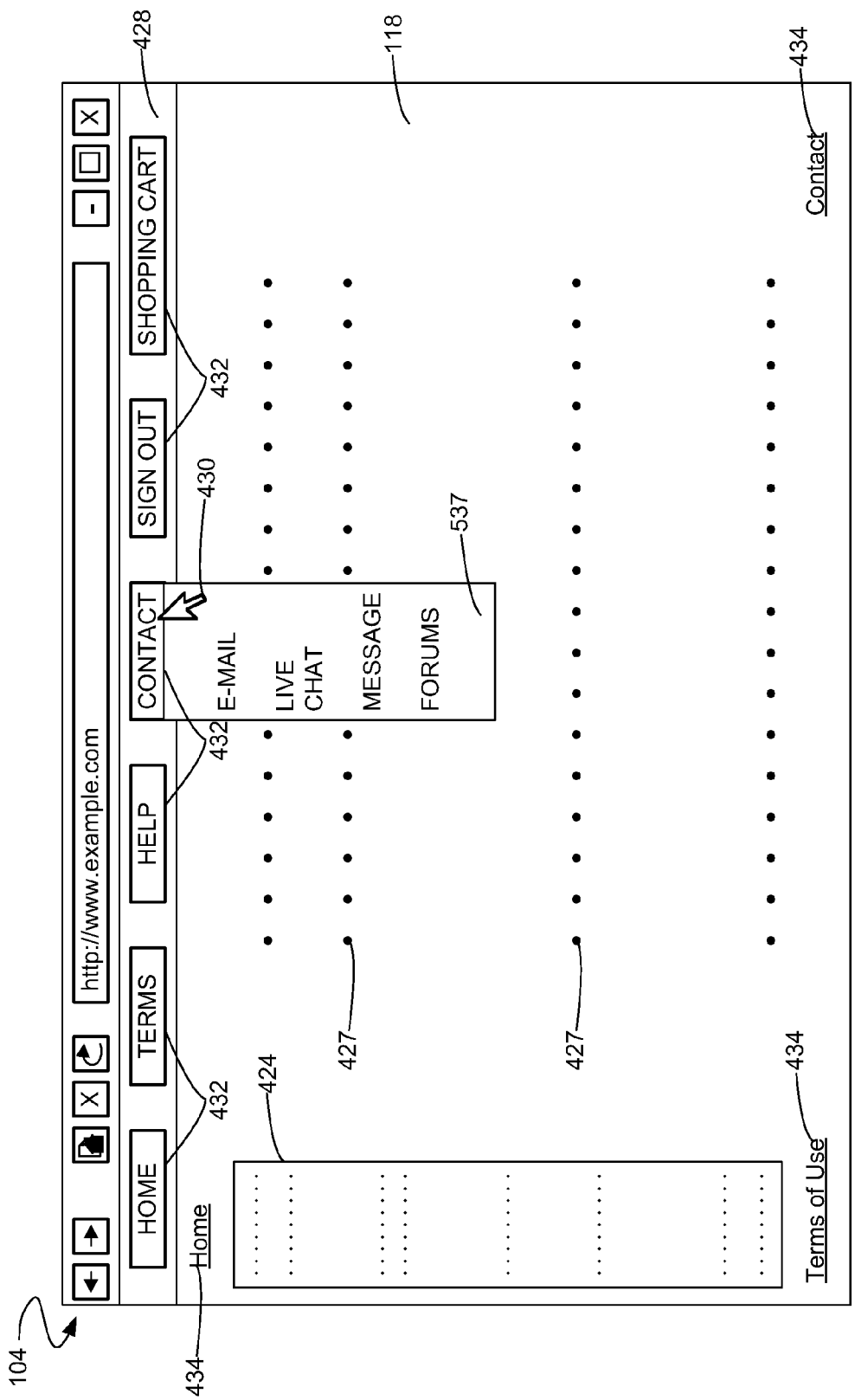
FIG. 5B shows an exemplary screenshot of a browser application comprising a drop-down menu in accordance with one embodiment of the present invention.

FIG. 5B shows an exemplary screenshot of a browser application comprising a drop-down menu 537 in accordance with one embodiment of the present invention.

Typical web content on a webpage 118 may include links 434 to other webpages 118 within a website or links 434 to other webpages 118 external to the website. Web content may also include text 427 displayed on the webpage 118 or sidebar information 424. Browser application 104 can be configured to install a PINO 106 (FIG. 1) plug-in employing a graphical user interface, as described above. A PINO 106 plug-in can be a toolbar 428 embedded into the browser application 104. The toolbar 428 can be configured to be displayed anywhere within the browser application 104 and can be hidden when not in use. Toolbar 428 can be configured to store and implement user personalized commands 320 (FIG. 3) for a personalized display and interaction experience custom designed by the user. User personalized commands 320 (FIG. 3) can be implemented using personalized buttons 432 within the toolbar 428. Each personalized button 432 can be associated with a respective website command and when triggered, can lead to the display of website information in a screen location and in a display format customized for the user, regardless of the website.

For example, personalized buttons 432 can be created for "HOME", "TERMS", "HELP", "CONTACT", "SIGN OUT", and "SHOPPING CART" on a particular website. Each personalized button 432 is associated with the respective webpage 118 within the website. A user may click 430 a personalized button 432 in order to access the respective webpage 118 associated with that personalized button 432. For example, a user click 430 on the personalized button 432 "CONTACT" would launch a drop-down menu 537 displaying methods for contacting the administrators of the website. The specific contact links displayed in the drop-down menu 537 are based on user personalized commands 320 (FIG. 3). It can be appreciated that a user personalized button 432 can be associated with a link 434 to a webpage 118 that is buried within another link 434 on the website. By interfacing with the standardized interchange protocol 112 (FIG. 1), PINO 106 does not require knowledge of the unique location of the contact links for the particular webpage 118. This custom user configurability allows the user to navigate the website in the way that the user feels is best suited. Information pertinent to the buttons 432 may be obtained by accessing the website data via the standardized protocol 112 (FIG. 1) which would have prescribed definitions for finding the data.

Figure 5C:
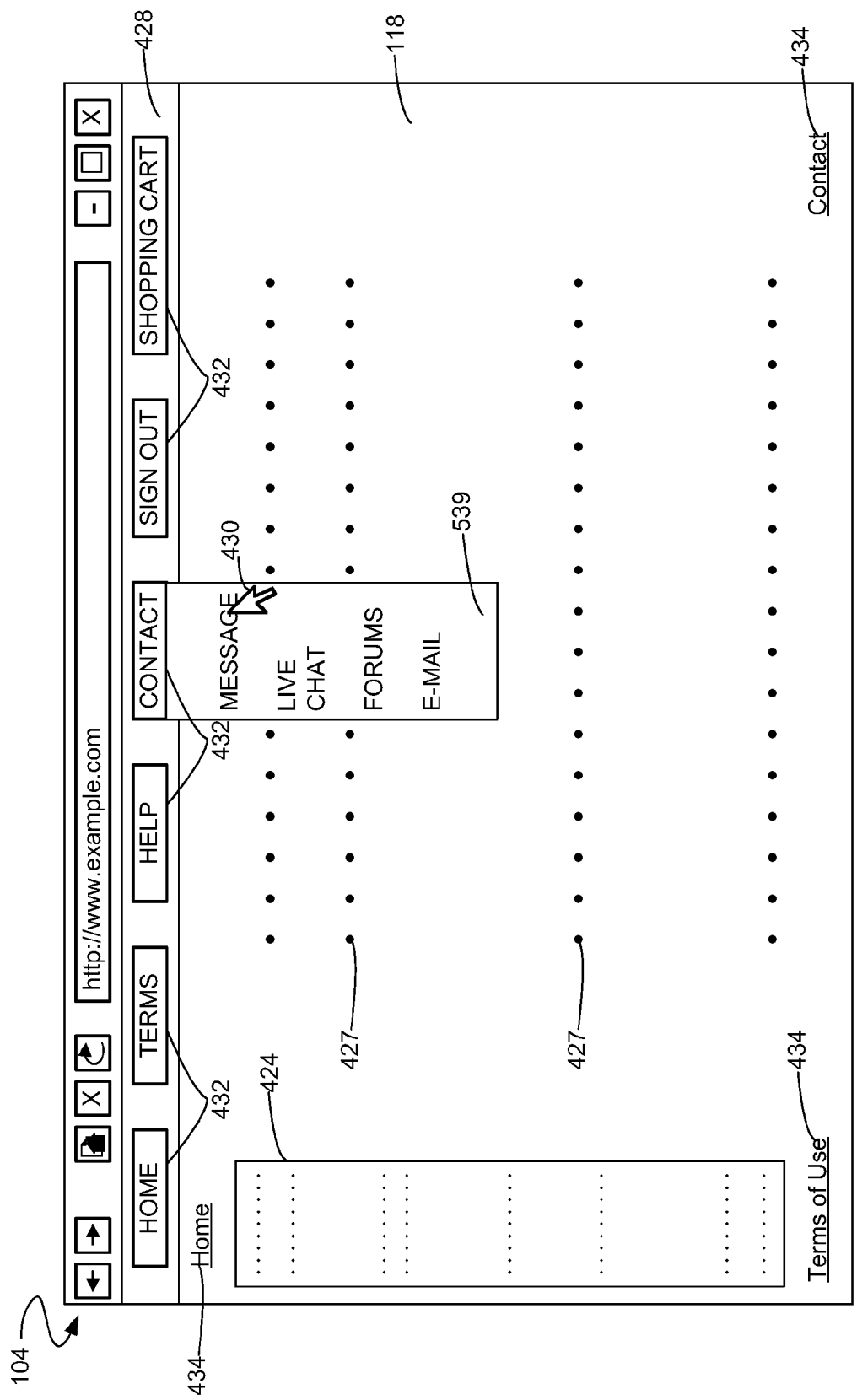
FIG. 5C shows an exemplary screenshot of a browser application displaying a drop-down menu based on user history information in accordance with one embodiment of the present invention.

FIG. 5C shows an exemplary screenshot of a browser application displaying a drop-down menu 539 based on user history information 322 (FIG. 3) in accordance with one embodiment of the present invention. FIG. 5C is analogous to FIG. 5B except that the drop-down menu is organized based on user history information 322 (FIG. 3).

Typical web content on a webpage 118 may include links 434 to other webpages 118 within a website or links 434 to other webpages 118 external to the website. Web content may also include text 427 displayed on the webpage 118 or sidebar information 424. Browser application 104 can be configured to install a PINO 106 (FIG. 1) plug-in employing a graphical user interface, as described above. A PINO 106 plug-in can be a toolbar 428 embedded into the browser application 104. The toolbar 428 can be configured to be displayed anywhere within the browser application 104 and can be hidden when not in use. Toolbar 428 can be configured to store and implement user history information 322 (FIG. 3) for a personalized display and interaction experience custom designed by the user. User history information 322 (FIG. 3) can be implemented using personalized buttons 432 within the toolbar 428. Each personalized button 432 can be associated with a respective website command and when triggered, can lead to the display of website information in a screen location and in a display format customized for the user, regardless of the website.

For example, personalized buttons 432 can be created for "HOME", "TERMS", "HELP", "CONTACT", "SIGN OUT", and "SHOPPING CART" on a particular website. Each personalized button 432 is associated with the respective webpage 118 within the website. A user may click 430 a personalized button 432 in order to access the respective webpage 118 associated with that personalized button 432. For example, a user click 430 on the personalized button 432 "CONTACT" would launch a drop-down menu 537 (FIG. 5B) displaying methods for contacting the administrators of the website. Based on user history information 322 (FIG. 3), the specific contact links displayed in the drop-down menu 537 (FIG. 5B) that the user uses most often during visits to the particular webpage 118 can be organized with the most frequently used contact link placed at the top. For example, if the user uses the "MESSAGE" link within the drop-down menu 537 (FIG. 3), the "MESSAGE" link can be placed at the top of an organized drop-down menu 539. By interfacing with the standardized interchange protocol 112 (FIG. 1), PINO 106 does not require knowledge of the unique location of the contact links for the particular webpage 118. This custom user configurability allows the user to navigate the website in the way that the user feels is best suited. Information pertinent to the buttons 432 may be obtained by accessing the website data via the standardized protocol 112 (FIG. 1) which would have prescribed definitions for finding the data.

Figure 6:
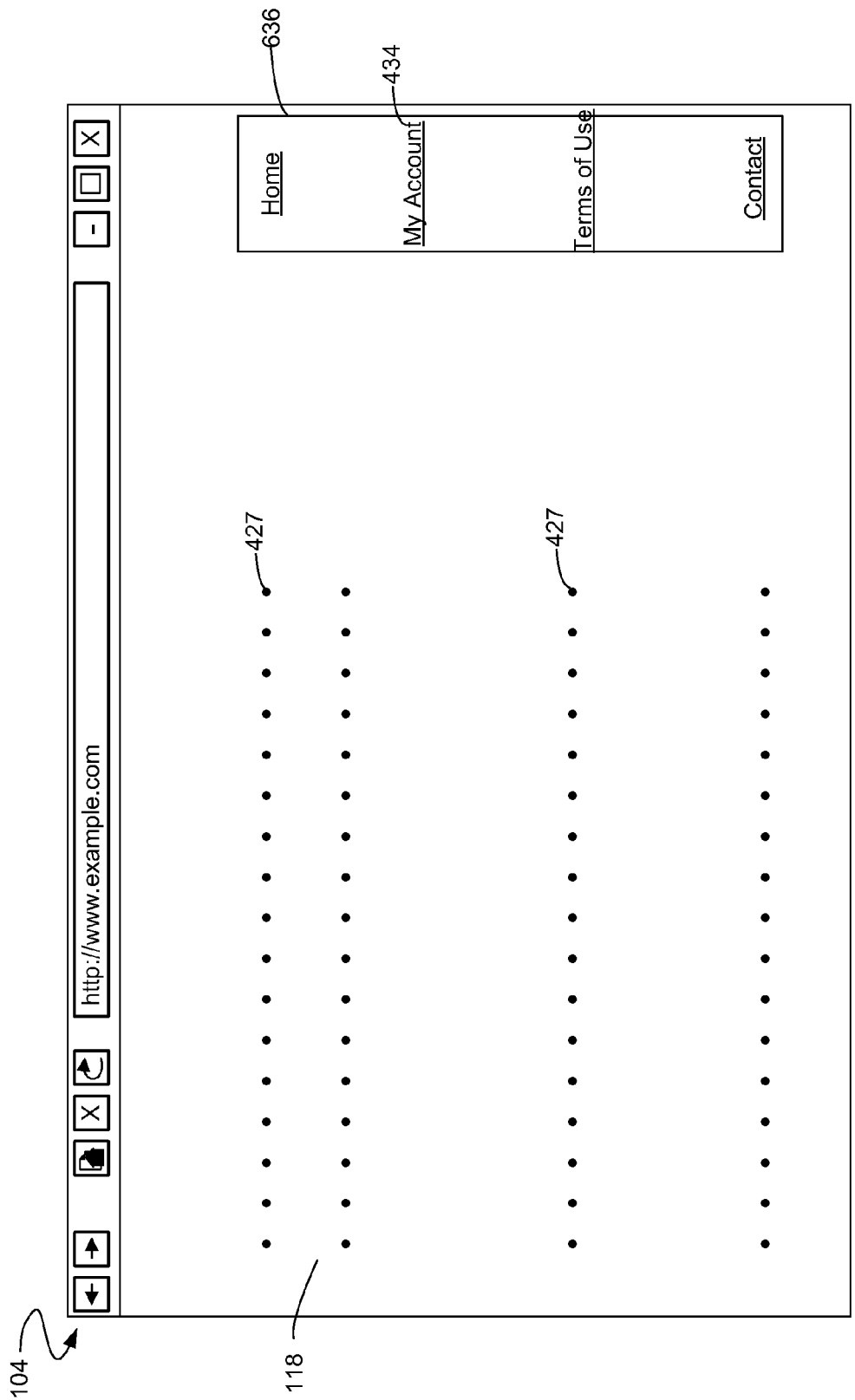
FIG. 6 shows an exemplary screenshot of a browser application displaying web content based on prescribed display attributes which are defined for the user in accordance with one embodiment of the present invention.

FIG. 6 shows an exemplary screenshot of a browser application 104 displaying web content based on prescribed display attributes in accordance with one embodiment of the present invention.

Typical web content on a webpage 118 may include links 434 to other webpages 118 within a website or links 434 to other webpages 118 external to the website. Web content may also include text 427 displayed on the webpage 118. Browser application 104 can be configured to install a PINO 106 (FIG. 1) plug-in employing a graphical user interface, as described above. The PINO 106 (FIG. 1) interface can be configured to display webpage 118 content using prescribed display attributes. PINO 106 (FIG. 1) can store user personalized commands 320 (FIG. 3) to display webpage 118 content in a manner the user finds most suitable. Display attributes can include, but are not limited to, font size, layout, colors, etc.

For example, a user may prefer that all links 434 found on a particular webpage 118 be aggregated into one column in a certain location on the webpage 118. The user can configure PINO 106 (FIG. 1) to display all links 434 found on the webpage 118 to display in a column 636 on the right hand side of the webpage 118, as displayed in FIG. 6. The links 434 found in the column 636 may also be reorganized depending on the user's history information 322 (FIG. 3). Users may alter website content in any way that the user feels is the best suited to their web viewing experience. By interfacing with the standardized interchange protocol 112 (FIG. 1), PINO 106 does not require knowledge of the unique location of the links 434 for the particular webpage 118.

Figure 7:
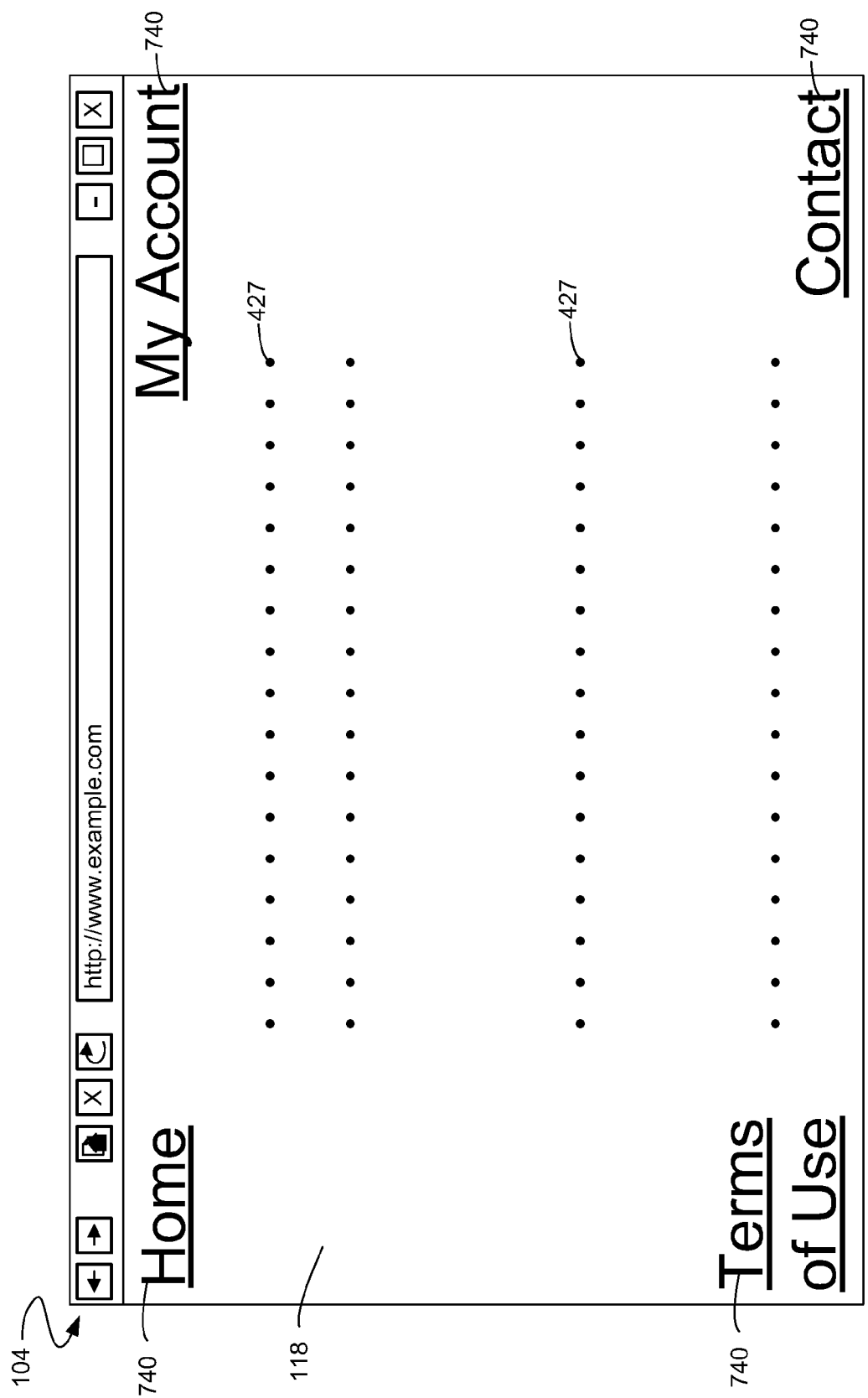
FIG. 7 shows an exemplary screenshot of a browser application displaying web content based on prescribed display attributes comprising font size and color in accordance with one embodiment of the present invention.

FIG. 7 shows an exemplary screenshot of a browser application 104 displaying web content based on prescribed display attributes comprising font size and color in accordance with one embodiment of the present invention.

Typical web content on a webpage 118 may include links 434 to other webpages 118 within a website or links 434 (FIG. 4A) to other webpages 118 external to the website. Web content may also include text 427 displayed on the webpage 118. Browser application 104 can be configured to install a PINO 106 (FIG. 1) plug-in employing a graphical user interface, as described above. The PINO 106 (FIG. 1) interface can be configured to display webpage 118 content using prescribed display attributes. PINO 106 (FIG. 1) can store user personalized commands 320 (FIG. 3) to display webpage 118 content in a manner the user finds most suitable. Display attributes can include, but are not limited to, font size, layout, colors, etc.

For example, a user may prefer that all links 434 (FIG. 4A) and text 427 displayed on a webpage 118 use a larger font size than the webpage 118 default font size. The user can configure PINO 106 (FIG. 1) to display all links 434 (FIG. 4A) and text 427 displayed on the webpage 118 to display in a font size larger 740 than the default font size on the webpage 118, as displayed in FIG. 6. By interfacing with the standardized interchange protocol 112 (FIG. 1), PINO 106 does not require knowledge of the unique location of the font capability for the particular webpage 118. Users may alter website content in any way that the user feels is the best suited to their web viewing experience.

Figure 8:
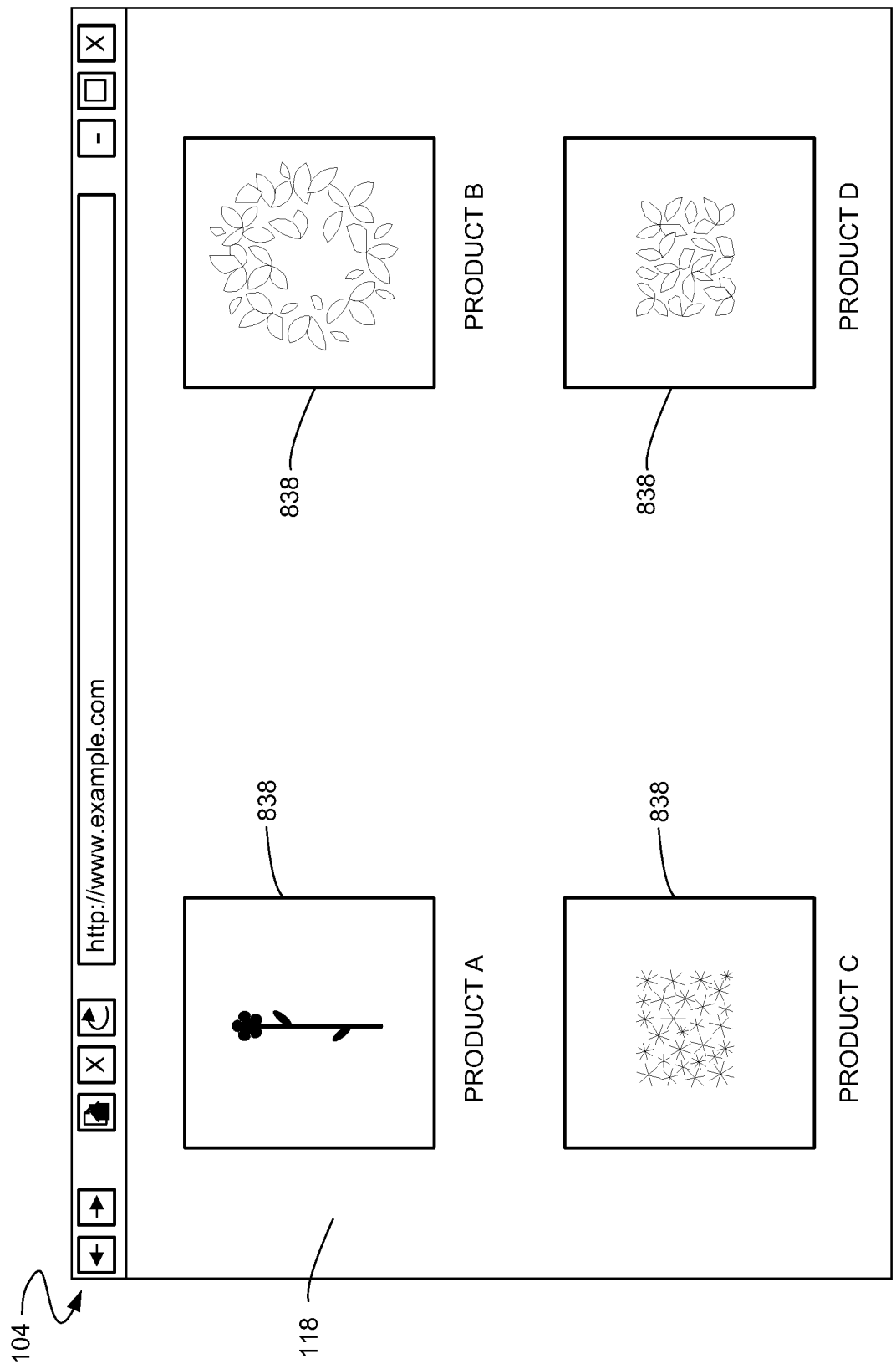
FIG. 8 shows an exemplary screenshot of a browser application displaying web content based on a history of purchased items in accordance with one embodiment of the present invention.

FIG. 8 shows an exemplary screenshot of a browser application 104 displaying web content based on a history of purchased items in accordance with one embodiment of the present invention.

Typical web content on a webpage 118 may include links 434 (FIG. 4A) to other webpages 118 within a website or links 434 (FIG. 4A) to other webpages 118 external to the website. Web content may also include text 427 (FIG. 4A) displayed on the webpage 118. PINO 106 (FIG. 2) may reside within the service provider 116 (FIG. 2). By residing within service provider 116 (FIG. 2), PINO 106 (FIG. 2) capability can be embedded into webpages 118 and configured by the service provider 116 (FIG. 2). Service provider 116 (FIG. 2) can specify which actions and displays will be offered for specific instructions that are typically not interpreted for use in webpage 118 navigation.

For example, a user event can trigger PINO 106 (FIG. 2) to automatically cause information regarding products for sale by a website to be displayed on the webpage 118 based on past stored user history information 322 (FIG. 3). PINO 106 (FIG. 2) can cause product recommendations 838 based on a user's past interest in certain products previously displayed on the webpage 118. For example, if a user has previously clicked product links related to agriculture on a particular webpage 118, PINO 106 (FIG. 2) stores this user history information 322 (FIG. 3) and displays product recommendations 838 for agricultural products closely related to the user's past product viewing history. It can be appreciated that product recommendations 838 are not limited to just one category and PINO 106 (FIG. 2) can cause information regarding a plurality of product categories to be simultaneously displayed to the user.

Figure 9:
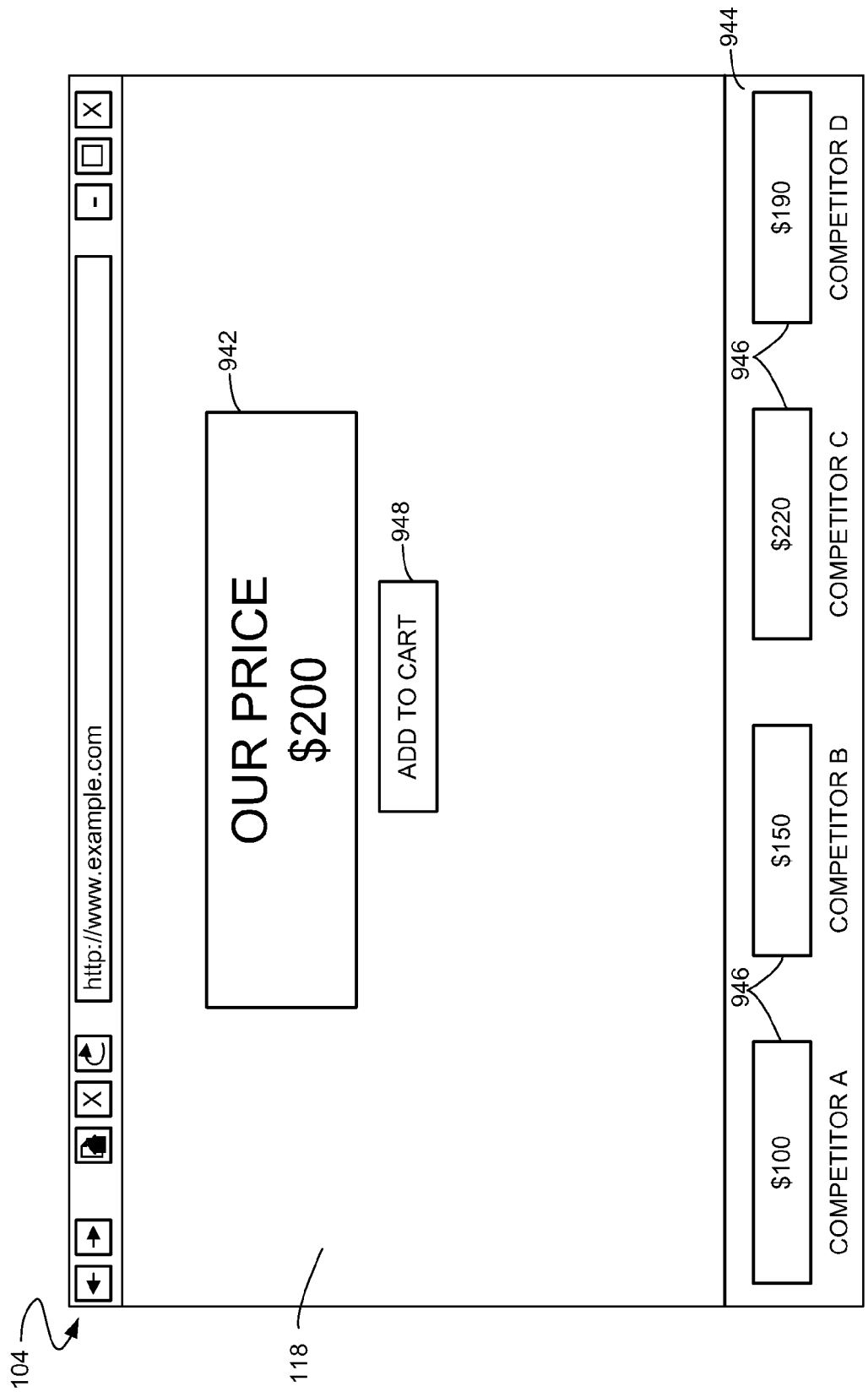
FIG. 9 shows an exemplary screenshot of a browser application displaying web content based on pricing information of a plurality of websites in accordance with one embodiment of the present invention.

FIG. 9 shows an exemplary screenshot of a browser application 104 displaying web content based on pricing information of a plurality of websites in accordance with one embodiment of the present invention.

Typical web content on a webpage 118 may include links 434 (FIG. 4A) to other webpages 118 within a website or links 434 (FIG. 4A) to other webpages 118 external to the website. Web content may also include text 427 (FIG. 4A) displayed on the webpage 118. PINO 106 (FIG. 2) may reside within the service provider 116 (FIG. 2). By residing within service provider 116 (FIG. 2), PINO 106 (FIG. 2) capability can be embedded into webpages 118 and configured by the service provider 116 (FIG. 2). Service provider 116 (FIG. 2) can specify which actions and displays will be offered for specific instructions that are typically not interpreted for use in webpage 118 navigation.

For example, a user event can trigger PINO 106 (FIG. 2) to automatically cause information regarding pricing information from a plurality of websites 946 to be displayed on the webpage 118 based on a potential user purchase. After displaying a price 942 for a product or service offered by the webpage 118, a user may be presented with a clickable link 948 to begin the checkout process. Typically, this clickable link 948 can be an "Add to Cart" button or similar. Once the user opts to begin the checkout process by issuing a command or gesture to engage the clickable link 948, PINO 106 (FIG. 2) will intercept and temporarily halt communications via the communication pathway 114 (FIG. 2) between the browser application 104 and the service provider 116 (FIG. 2). PINO 106 (FIG. 2) will then broadcast requests for pricing information to other websites providing products or services similar to those being offered by the webpage 118 and present those prices 946 in a toolbar 944 within the browser application 118. It can be appreciated that pricing information can be presented to the user in other layouts aside from a toolbar, such as a pop-up window, an e-mail notification, or any other means for notifying the user of pricing information from other websites.

After presenting pricing information 946 from other websites to the user, PINO 106 (FIG. 2) provides the user an option to ignore the pricing information 946 presented and continue with the original checkout intended on the webpage 118, or to select the product or service based on the pricing information 946 from another website. If the user elects to continue with the originally intended checkout on the webpage 118, PINO 106 (FIG. 2) will restore the communication via the communication pathway 114 (FIG. 2) between the browser application 104 and the service provider 116 (FIG. 2). If the user elects to pick a product or service based on pricing information 946 from another website, PINO 106 (FIG. 2) will transfer communications from the browser application 104 to the respective service provider hosting the product or service the user wishes to purchase.

Figure 10:
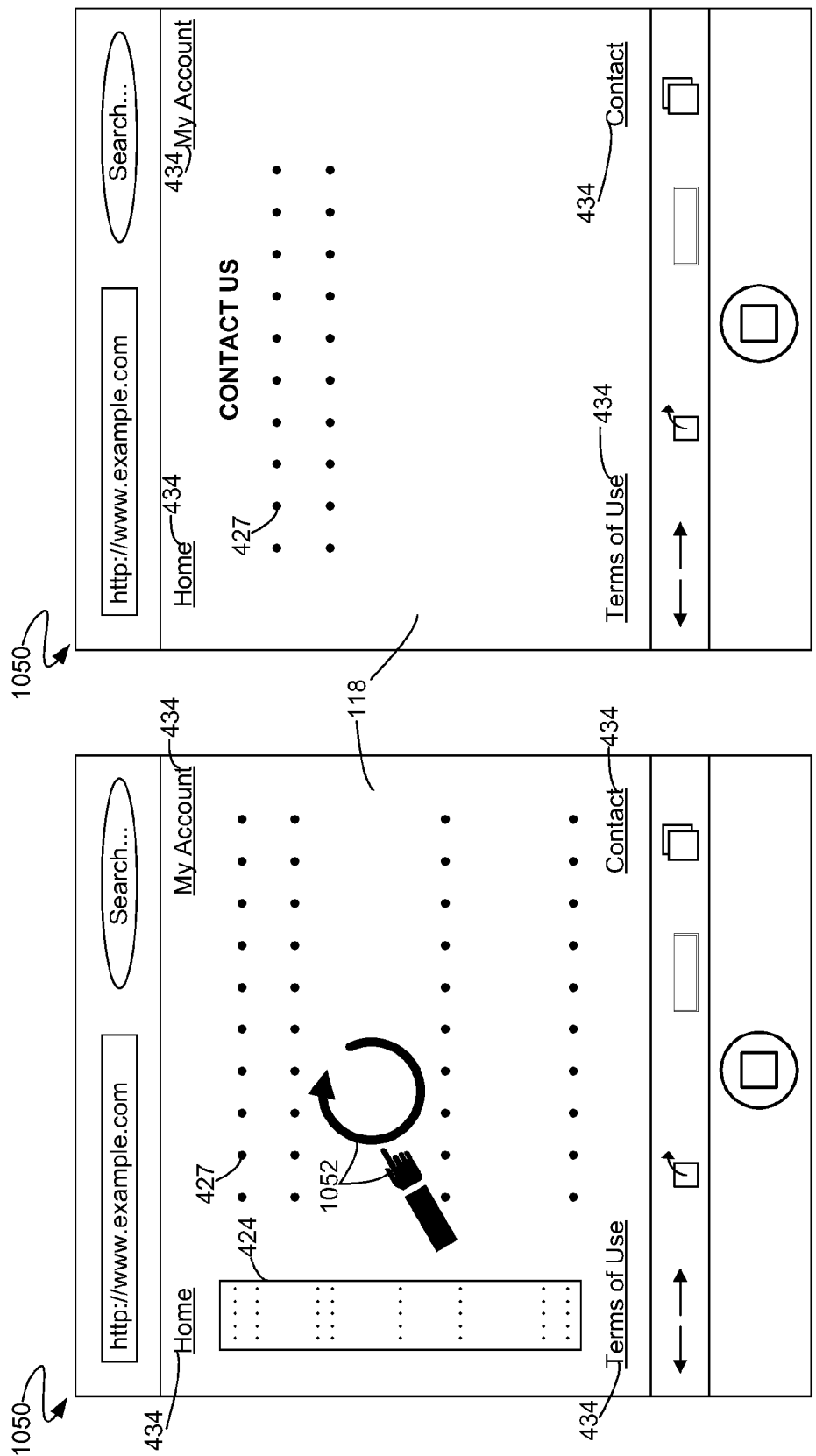
FIG. 10A shows an exemplary screenshot of a browser application on a touchscreen device in accordance with one embodiment of the present invention.
FIG. 10B shows an exemplary screenshot of a browser application on a touchscreen device displaying web content based on a custom user defined gesture in accordance with one embodiment of the present invention.

FIGS. 10A and 10B illustrate PINO 106 (FIG. 1) functionality on a touchscreen device. FIG. 10A shows a screenshot of a touchscreen browser application 1050 on a touchscreen device in accordance with one embodiment of the present invention. FIG. 10B shows a screenshot of a browser application 1050 on a touchscreen device displaying web content based on a custom user defined gesture in accordance with one embodiment of the present invention.

The touchscreen browser application 1050 is an application within an operating system 102 (FIG. 1) on a computer system 101 (FIG. 1). The computer system 101 (FIG. 1) can be a mobile computer system, such as mobile phone or tablet device. Touchscreen browser application 1050 is used to display web content of a webpage 118 hosted by a service provider 116 (FIG. 2).

Typical web content on a webpage 118 may include links 434 to other webpages 118 within a website or links 434 to other webpages 118 external to the website. Web content may also include text 427 displayed on the webpage 118 or sidebar information 424. Touchscreen browser application 104 can be configured to install a PINO 106 (FIG. 1) plug-in employing a graphical user interface, as described above. Alternatively, touchscreen browser application 104 can already have a PINO 106 (FIG. 1) implementation embedded by the manufacturer of the application. The PINO 106 (FIG. 1) application can be configured to recognize custom user defined gestures and execute a respective website command defined for each custom user defined gesture. PINO 106 (FIG. 1) can be configured to store and implement the custom user defined gestures as user personalized commands 320 (FIG. 3) for a personalized display and interaction experience.

A custom user defined gesture can cause PINO 106 (FIG. 1) to execute a website command for clicking a link 434 displayed on the webpage 118. It can be appreciated that the link 434 does not have to be displayed on the webpage 118 and the link 434 can also be buried in another location within the website. For example, a user can define that a circle gesture 1052 using an input device (or a user's finger) will cause PINO 106 (FIG. 1) to redirect the user to a "Contact" page located within the website. When a user gestures a circle motion 1052 within the browser application 1050, PINO 106 (FIG. 1) will direct the user to a "Contact" page located within the website (see FIG. 10B). It can be appreciated that a user can define any gesture motion, such as a circle, square, swipe, multi-finger tap, etc. A user can also configure custom user defined gestures to execute other respective website commands such as, increasing font, rearranging webpage 118 layout, changing color, initiating a purchase, etc.

Figure 11:
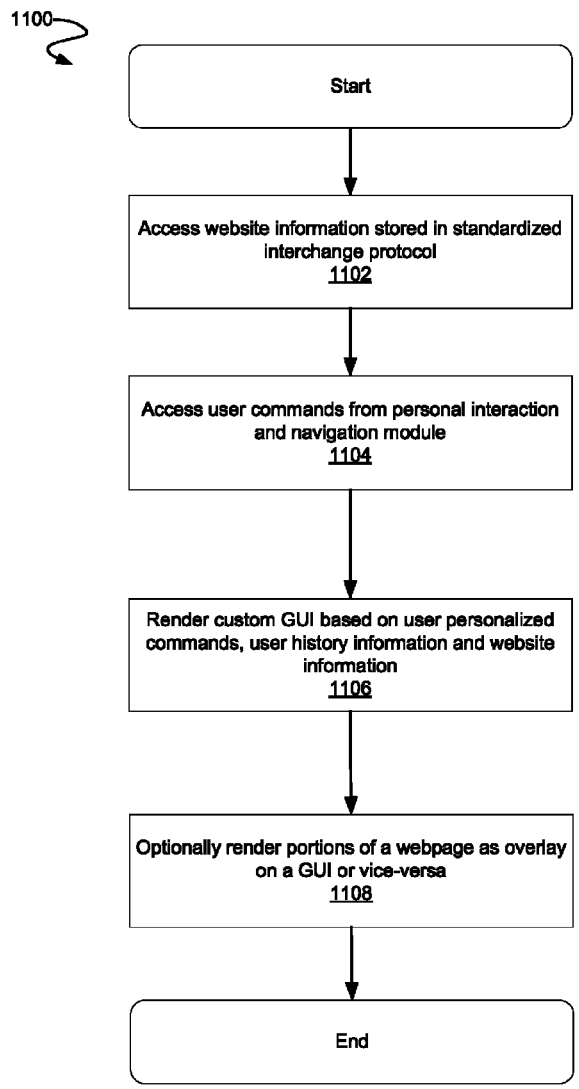
FIG. 11 depicts a flowchart of an exemplary computer controlled process of rendering a custom graphical user interface based on user personalized commands and website information.

FIG. 11 depicts a flowchart 1100 of an exemplary computer controlled process of rendering a custom graphical user interface based on user personalized commands and website information. In a block 1102, PINO accesses website information that is stored in a standardized interchange protocol. For example, in FIG. 1, PINO obtains information about the webpages hosted by the service provider by interfacing with the standardized interchange protocol via the communication pathway.

In a block 1104, PINO accesses user commands that it has stored. For example, in FIG. 3, PINO accesses the stored user personalized commands and user history information. The user personalized commands have been configured by the user for the user to view the particular webpage in a manner the user finds most useful and productive. The user history information has accumulated by monitoring the user's actions using the user snooper module.

In a block 1106, PINO renders a custom GUI based on user personalized commands, user history information, and website information. For example, in FIG. 4A, PINO renders a custom toolbar based user personalized commands. Personalized buttons on the toolbar are created for "HOME", "TERMS", "HELP", "CONTACT", "SIGN OUT", and "SHOPPING CART" on a particular website. Each personalized button is associated with the respective webpage within the website. A user may click a personalized button in order to access the respective webpage associated with that personalized button.

In another example, in FIG. 5C, PINO renders a custom drop-down menu organized with the most frequently used link at the top of the drop-down menu. Based on user history information, the specific contact links displayed in the drop-down menu that the user uses most often during visits to the particular webpage can be organized with the most frequently used contact link placed at the top. For example, if the user uses the "MESSAGE" link within the drop-down menu, the "MESSAGE" link can be placed at the top of an organized drop-down menu.

In a block 1108, PINO optionally renders portions of a webpage as overlay on a GUI. For example, in FIG. 5A, PINO renders a pop-up window based on user personalized commands. A user click on the personalized button "SHOPPING CART" would launch a pop-up window displaying the contents of the user's shopping cart.

Figure 12:
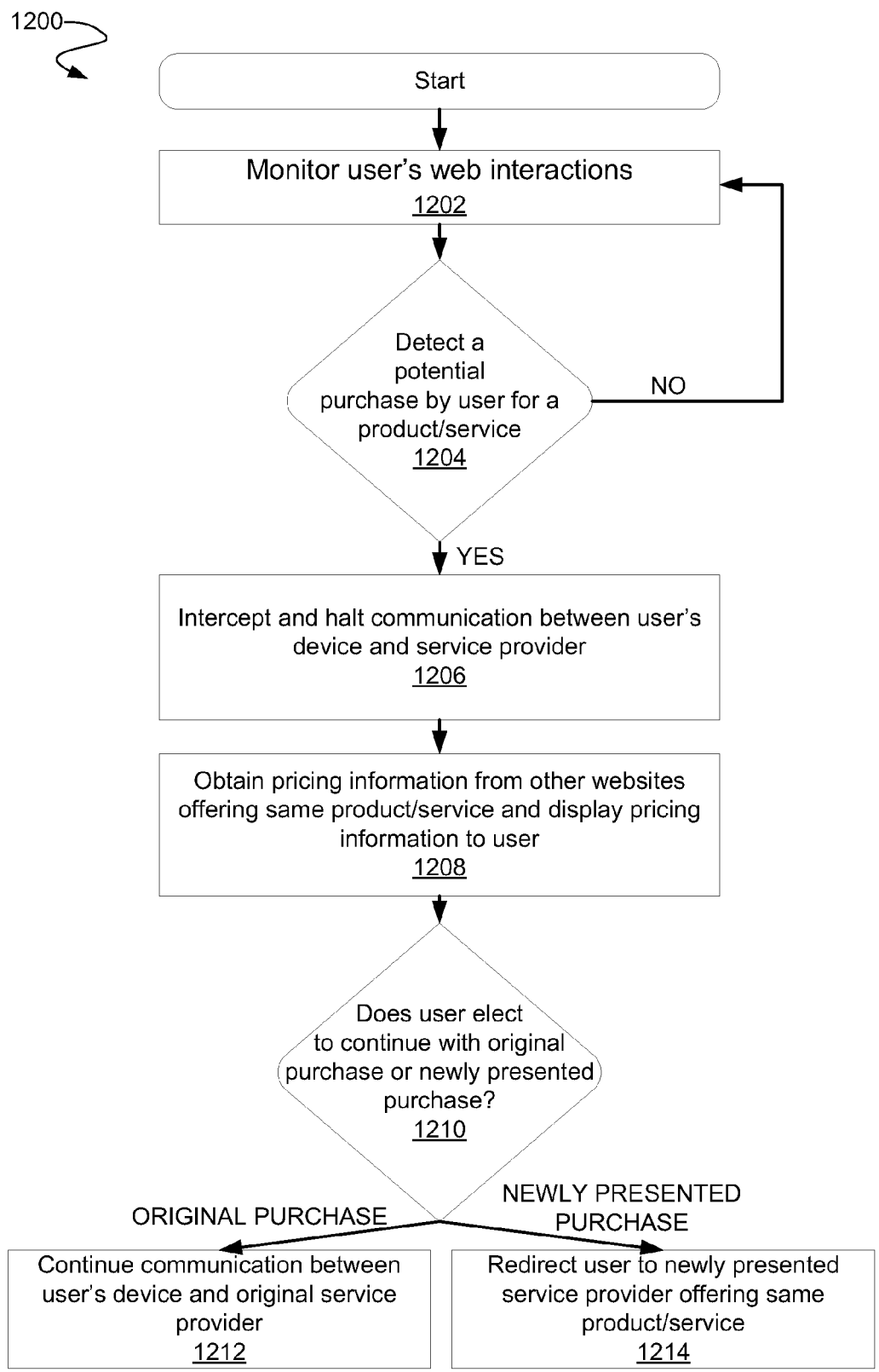
FIG. 12 depicts a flowchart of an exemplary computer controlled process of displaying web content based on pricing information of a plurality of websites in accordance with one embodiment of the present invention.

FIG. 12 depicts a flowchart 1200 of an exemplary computer controlled process of displaying web content based on pricing information of a plurality of websites in accordance with one embodiment of the present invention. In a block 1202, PINO monitors and tracks user's web interactions with a website or a plurality of websites. In a block 1204, PINO waits to detect a potential purchase by the user for a product or service offered on a webpage. PINO continues to monitor the user's web interactions, block 1202, until it detects a potential purchase by the user for a product or service offered on a webpage.

For example, in FIG. 9, PINO monitors the user's web interactions on the webpage displayed in the browser application. PINO continues to monitor the user's web interactions until the user elects to purchase the product or service being offered for $200 and elects to begin the checkout process by clicking "Add to Cart" to add the product or service to the user's shopping cart.

In a block 1206, PINO intercepts and halts communication between the user's device and the service provider. PINO has the ability to intercept and halt any communications between the browser application on the computer system and the service provider via the communication pathway. For example, in FIG. 9, after the user elects to add the product or service to the user's shopping cart, PINO will intercept and halt the next transaction between the user's computer system and the service provider. Typically, this next communication would be a redirection by the service provider to a checkout webpage displaying the user's shopping cart contents and requesting payment information from the user. PINO will prevent the service provider from redirecting the user to this next page.

In a block 1208, PINO obtains pricing information from other websites offering the same product or service that the user is about to purchase from the original service provider's website. PINO then displays this pricing information to the user via a toolbar, pop-up, notification, or other method for presenting the user with the pricing information. For example, in FIG. 9, PINO displays pricing information for the $200 product the user is about to purchase from other competing service provider's websites. The pricing information is displayed within a toolbar at the bottom of the browser application. The user is presented with four optional purchase choices. The user may then elect to purchase the product or service from the original service provider's website, as originally intended, or to purchase the product or service from one of the newly presented service provider's websites, block 1210.

In a block 1212, if a user elects to purchase the product or service from the original service provider's website, as originally intended, PINO will restore and continue communications between the user's device and the original service provider. For example, in FIG. 9, PINO will restore communication between the browser application on the user's computer system and the service provider to allow the service provider to present the next communication. Typically, this next communication would be a redirection by the service provider to a checkout webpage displaying the user's shopping cart contents and requesting payment information from the user.

In a block 1214, if a user elects to purchase the product or service from one of the newly presented service provider's websites, PINO will redirect the user to the newly presented service provider's website to initiate a checkout process on the newly presented service provider's website. For example, in FIG. 9, if a user elects to purchase from one of the other competing service provider's websites displayed within the toolbar at the bottom of the browser application, PINO will redirect the user to the competing service provider's website to complete the purchase.

Figure 13:
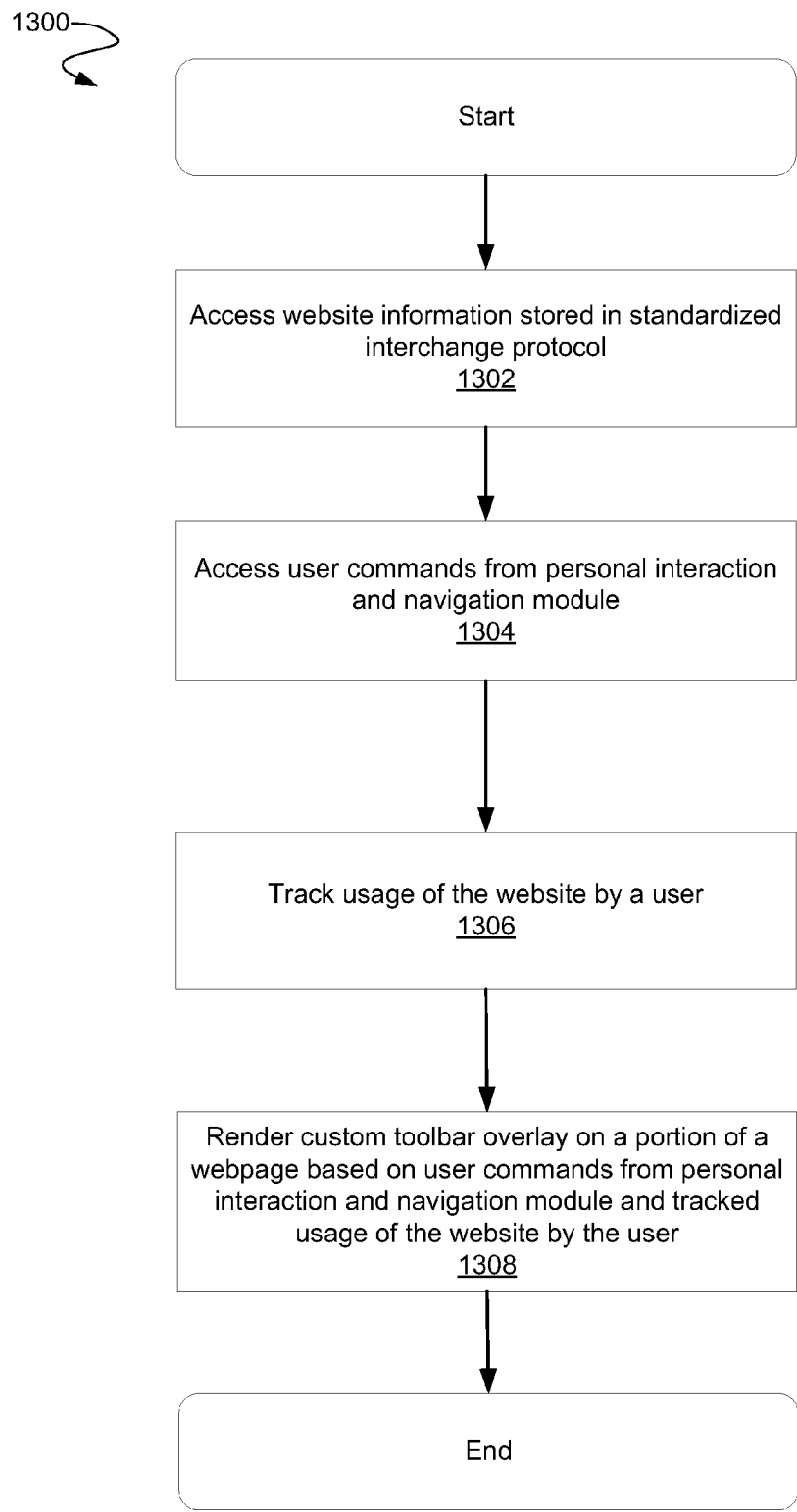
FIG. 13 depicts a flowchart of an exemplary computer controlled process of displaying rendering a custom toolbar on a website based on user personalized commands and tracked usage of the website by the user.

FIG. 13 depicts a flowchart of an exemplary computer controlled process of displaying rendering a custom toolbar on a website based on user personalized commands and tracked usage of the website by the user. In a block 1302, PINO accesses website information that is stored in a standardized interchange protocol. For example, in FIG. 1, PINO obtains information about the webpages hosted by the service provider by interfacing with the standardized interchange protocol via the communication pathway.

In a block 1304, PINO accesses user commands that it has stored. For example, in FIG. 3, PINO accesses the stored user personalized commands and user history information. The user personalized commands have been configured by the user for the user to view the particular webpage in a manner the user finds most useful and productive. The user history information has accumulated by monitoring the user's actions using the user snooper module.

In a block 1306, PINO tracks usage of a website by a user. For example, in FIG. 3, PINO can track the usage of a website by a user using the user snooper module. The user snooper module monitors the user's activity on a website allowing PINO to create user history information.

In a block 1308, PINO renders a custom toolbar overlay on a portion of a webpage based on user commands from user personalized commands and tracked user history information. For example, in FIG. 4A, PINO renders a custom toolbar based user personalized commands. Personalized buttons on the toolbar are created for "HOME", "TERMS", "HELP", "CONTACT", "SIGN OUT", and "SHOPPING CART" on a particular website. Each personalized button is associated with the respective webpage within the website. A user may click a personalized button in order to access the respective webpage associated with that personalized button.

In another example, in FIG. 5C, PINO renders a custom drop-down menu within a toolbar, the drop down menu organized with the most frequently used link at the top of the drop-down menu. Based on user history information, the specific contact links displayed in the drop-down menu within the toolbar that the user uses most often during visits to the particular webpage can be organized with the most frequently used contact link placed at the top. For example, if the user uses the "MESSAGE" link within the drop-down menu, the "MESSAGE" link can be placed at the top of an organized drop-down menu.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. An interactive system comprising:
a processor;
a browser application executed by said processor allowing a user to access a plurality of websites using at least one communication pathway, wherein a corresponding website provides website information in a standardized interchange protocol and also in webpages and wherein said browser application is configured to allow user access to said web pages; and
a module of said browser application compatible with said standardized interchange protocol and configured to store and implement user personalized commands and to store recorded user history information, said module implementing a graphical user interface with said website information that is personalized to said user and wherein said graphical user interface comprises a personalized display experience and a personalized interaction experience which are both custom designed for said user, regardless of which website is accessed such that said graphical user interface is implementable across multiple websites;
wherein said user personalized commands further comprise a plurality of custom user defined gestures and a respective website command defined for each custom user defined gesture, wherein a user defined gesture executes a website command for clicking a link that is not displayed on a webpage currently displayed and is buried in another webpage of said corresponding website.

2. The interactive system as described in claim 1 wherein said user personalized commands comprise a plurality of custom user defined gestures and a respective website command defined for each custom user defined gesture.

3. The interactive system as described in claim 2 wherein a respective website command comprises a website navigation command.

4. The interactive system as described in claim 1 wherein said user personalized commands comprise a plurality of website content definitions pertaining to said website information and a respective predefined display position for each content definition for display thereof.

5. The interactive system as described in claim 1 wherein said user personalized commands comprise a defined interactive event to occur based on content of said website information in combination with said user history information.

6. The interactive system as described in claim 1 wherein said user personalized commands comprise a defined interactive event to occur based on content of said website information in combination with a real-time user interaction.

7. The interactive system as described in claim 1 wherein said user history information comprises information based on past user interactions pertinent to said website.

8. The interactive system as described in claim 1 wherein said user history information comprises information based on past user interactions pertinent to a plurality of websites.

9. The interactive system as described in claim 1 wherein said user personalized commands define content of said website information to be displayed using prescribed display attributes.

10. An interactive system comprising:
a processor;
a browser application executed by said processor allowing a user to access a plurality of websites using at least one communication pathway including the Internet, wherein a corresponding website provides website information in a standardized interchange protocol and also in user navigable webpages and wherein said browser application is configured to allow user access to said webpages; and a module interactive with said browser application, said module compatible with said standardized interchange protocol and configured to store and implement user personalized commands that are user programmable and to store recorded user history information, said module implementing a graphical user interface with said website information that is personalized to said user and wherein said graphical user interface comprises a personalized display experience and a personalized interaction experience which are both custom to said user, regardless of which website is accessed such that said graphical user interface is implementable across multiple websites, and wherein further said user personalized commands define an on-screen tool comprising a plurality of defined graphical elements each, upon user interaction, accesses a respective predefined content of said website information and cause said respective predefined content to be rendered in a respective predefined display location of a display screen associated with said browser;

wherein said user personalized commands further comprise a plurality of custom user defined gestures and a respective website command defined for each custom user defined gesture, wherein a user defined gesture executes a website command for clicking a link that is not displayed on a webpage currently displayed and is buried in another webpage of said corresponding website.

11. The interactive system as described in claim 10 wherein said user personalized commands further comprise a plurality of custom user defined gestures and a respective website command defined for each custom user defined gesture.

12. The interactive system as described in claim 11 wherein a respective website command comprises a website navigation command.

13. The interactive system as described in claim 10 wherein said user personalized commands further comprise a defined interactive event to occur based on content of said website information in combination with said user history information.

14. The interactive system as described in claim 13 wherein said user history information comprises a history of purchased items by said user and wherein said defined user event includes a display of content of said website pertinent to said history of purchased items.

15. The interactive system as described in claim 10 wherein said user history information comprises information based on past user interactions with said website.

16. The interactive system as described in claim 10 wherein said user history information comprises information based on past user interactions with a plurality of websites.

17. The interactive system as described in claim 10 wherein said user personalized commands define content of said website information to be displayed using predefined display attributes, said display attributes comprising font size and color.

18. The interactive system as described in claim 10 wherein said on-screen tool is a tool bar and wherein a respective predefined content of said website information related to said on-screen tool bar comprises one of:

website help information, website login information, website contact information, user account information and user shopping cart information.

19. The interactive system as described in claim 10 wherein said module is a browser plug-in.

20. An interactive system comprising:

a processor;

a browser application executed by said processor allowing a user to access a plurality of websites using at least one communication pathway including the Internet, wherein a corresponding website provides website information in a standardized interchange protocol and also in user navigable webpages and wherein said browser application is configured to allow user access to said webpages; and a module interactive with said browser application, said module compatible with said standardized interchange protocol and configured to store and implement user personalized commands that are user programmable and to store recorded user history information, said module implementing a graphical user interface with said website information that is personalized to said user and wherein said graphical user interface comprises a personalized display experience and a personalized interaction experience which are both custom to said user, regardless of which website is accessed such that said graphical user interface is implementable across multiple websites, wherein said user personalized commands define a plurality of events that occur based on predefined rules, content of said website information and user behavior;

wherein said user personalized commands further comprise a plurality of custom user defined gestures and a respective website command defined for each custom user defined gesture, wherein a user defined gesture executes a website command for clicking a link that is not displayed on a webpage currently displayed and is buried in another webpage of said corresponding website.

21. The interactive system as described in claim 20 wherein said plurality of events occur also based on said user history information.

22. The interactive system as described in claim 20 wherein one of said plurality of events broadcasts requests for pricing information to other websites concerning an item requested to be purchased by said user interacting with said website.

23. The interactive system as described in claim 21 wherein one of said plurality of events automatically reorganizes a display listing of options obtained from content of said website information depending on said user history information.

24. The interactive system as described in claim 21 wherein one of said plurality of events automatically causes information regarding products for sale by said website to be displayed based on said user history information.

25. The interactive system as described in claim 20 wherein said module is a browser plug-in.

* * * * *